INVENTORS
JAMES W. STOOPS
GORDON M. BITTERLICH
MOSES R. LIPKIN
ALEX L. PRIMAS
BY Donald R. Johnson
ATTORNEY Nov. 25, 1969   J. W. STOOPS ET AL   3,480,416
GAS PREPARATION PROCESS AND APPARATUS Filed March 1, 1966   7 Sheets-Sheet 4

INVENTORS
JAMES W. STOOPS
GORDON M. BITTERLICH
MOSES R. LIPKIN
ALEX L. PRIMAS

BY Donald R. Johnson
ATTORNEY

Nov. 25, 1969  J. W. STOOPS ET AL  3,480,416
GAS PREPARATION PROCESS AND APPARATUS
Filed March 1, 1966  7 Sheets-Sheet 7

INVENTORS
JAMES W. STOOPS
GORDON M. BITTERLICH
MOSES R. LIPKIN
ALEX L. PRIMAS
BY Donald R. Johnson
ATTORNEY

United States Patent Office 3,480,416
Patented Nov. 25, 1969

3,480,416
GAS PREPARATION PROCESS AND APPARATUS
James W. Stoops, Thornbury, West Chester, Gordon M. Bitterlich, Wayne, Moses R. Lipkin, Havertown, and Alex L. Primas, Norristown, Pa., assignors, by direct and mesne assignments, of fifty percent to Sun Oil Company, Philadelphia, Pa., a corporation of New Jersey, and fifty percent to Howe-Baker Engineers, Inc., Tyler, Tex.
Continuation-in-part of application Ser. No. 426,785, Jan. 21, 1965, which is a continuation-in-part of application Ser. No. 351,412, Mar. 12, 1964. This application Mar. 1, 1966, Ser. No. 530,979
Int. Cl. C10j 3/00
U.S. Cl. 48—93                        24 Claims

ABSTRACT OF THE DISCLOSURE

A liquid hydrocarbon fraction is converted into a combustible gas (usable as a supplement and/or substitute for natural gas) by a combination of indirect thermal cracking and flame cracking. The make oil is fed as a liquid into and through a superheater, and the resulting superheated and partially-cracked vapor is thereafter fed, with or without the addition of steam, into a flame-cracking tube. A flame is provided at one end of this latter tube, and the superheated and partially-cracked vapor is fed into the tube adjacent this one end and directed into the flame. The indirect thermal cracking and flame cracking may be performed independently of each other.

---

This application is a continuation-in-part of application Ser. No. 426,785, filed Jan. 21, 1965, now abandoned, which was in turn a continuation-in-part of application Ser. No. 351,412, filed Mar. 12, 1964, now abandoned.

This invention relates to a process (method) and apparatus for preparing a combustible gas. In one aspect, it relates to a process and apparatus for continuous cracking of a liquid hydrocarbon fraction (hydrocarbon feed stock), using a combination of indirect thermal cracking and flame cracking, to produce a mixture of combustion products and product fuel gas at a temperature of about 800° F. to about 1600° F.

Various hydrocarbon feed stocks, ranging from low molecular weight gases and liquids to heavy residual fuels, have been cracked in water gas sets, oil gas sets, partial combustion reformers, and the like, to make combustible gases which are supplements and substitutes for natural gas.

The prior art processes and apparatus are quite complicated and expensive, and many problems have been encountered in the handling and separation of the oil, tar, and carbon by-products of the cracking process, making costs high. Capital and operating costs become increasingly significant when the gas is to be used only for ten to thirty or so days each winter during peak load conditions, or when it is to be used only under other temporary conditions.

One process or method of this invention may provide a satisfactory natural gas supplement or substitute having a heating value of 200–800 B.t.u. per cubic foot. If desired, the gas produced by one process of the present invention can be mixed as a carrier gas with propane or other high heating value gases (by way of example, such latter may have a heating value of from 500–3000 B.t.u. per cubic foot) to provide a gas having a higher heating value, for example over 1000 B.t.u. per cubic foot. In this way, the capacity of a propane-air plant can be greatly increased, at low cost, by employing applicants' process and apparatus, instead of by adding additional, expensive propane facilities. It should be noted, however, that many utilities, and many industrial users as well, use fuel gases having a heating value in the range of 300–700 B.t.u. per cubic foot, and these users can burn directly the gas produced by a process of this invention.

Processes previously developed for the production of a fuel gas from hydrocarbon feed stocks have for the most part been cyclic processes of the "blow-run" type, in which the gas making step is alternated with a heating step. Such a process would typically include the subjecting of oil (feed stock) to suitable heated surfaces, such as of checkerbrick, or a layer of small ceramic particles comprising a carbon filtering screen. The checkerbrick or carbon filtering screen would conventionally be incorporated in one or more chambers which are heated by passing a flame and the products of combustion therethrough. When the checkerbrick or filtering screen surfaces are at the desired temperature, the heating step is halted, and oil is introduced to the hot surfaces, the heat radiating therefrom effecting a cracking of the oil. The endothermic cracking reaction rapidly cools the heated surfaces to an unsuitably low temperature, so that the cracking step must be interrupted and the heating step reinstituted. The cyclic operation thus alternates between heating and cracking steps, resulting in an understandably low efficiency.

Continuous run processes have been developed, in which the chamber surfaces are continuously heated by an externally-applied heat source. Although continuous cracking may be effected in this manner, the brick or ceramic particles comprising the heated surfaces are generally not good conductors of heat, and, as the process continues, become even poorer heat conductors as carbon from the cracking reaction becomes deposited thereon. Such indirectly-heated continuous processes are thus relatively inefficient, and expensive to construct and maintain.

The primary disadvantage of the previous processes (which is characteristic of both the cyclic and continuous processes) is the formation of carbon deposits on the checkerbrick or carbon filtering screen surfaces. The carbon deposits may be so excessive as to render the apparatus inoperative, thus necessitating interruption of the process to permit carbon removal. A further problem is cracking and eroding of the heated surfaces, which must therefore be frequently replaced. In addition, the above-described processes characteristically produce a gas of varying quality, which cannot (without further treatment) be commercially distributed.

Another disadvantage of previous processes (which, like those previously mentioned, is not present in the process of the present invention) is that they require a long time for start-up, from a cold start. By way of example, the process of this invention requires a start-up time on the order of only 25–45 minutes, from a cold start.

It is important to note that the process of the present invention is not a shock pyrolysis process, such as that often used to make ethylene and acetylene. The shock pyrolysis process employs reaction temperatures above 2000° F. (which are not suitable for the process of the present invention), and also requires very rapid quenching, which is not necessary for the process of the present invention.

In the prior application Ser. No. 426,785, there was disclosed a process and apparatus for flame-cracking of a vaporized hydrocarbon feed stock, the feed stock (make oil) being fed as a vapor into direct contact with a flame. It has now been found, according to one aspect of the present invention, that important advantages may be obtained by first feeding the make oil as a liquid into and through a superheater (in which the oil is heated to a temperature of about 1250° F.), and thereafter feeding the stock as a superheated vapor, with or without the addition of steam, into a flame-cracking tube. Partial thermal cracking of the feed stock (e.g., naphtha) occurs in the superheater, and the desired degree of cracking is completed thereafter in the flame. There are very definite advantages to using this combination of partial thermal cracking (in the superheater) and flame-cracking, as compared to solely flame-cracking (with vapor feed to the flame). These advantages include (all referring to the product fuel gas): a higher methane and hydrogen content, a lower olefin content, a lower gravity, and a higher heating value.

It has also been found, according to this invention, that the thermal cracking which occurs in the fired superheater produces a desirable high heating value combustible gas product for some purposes which can be used directly (i.e., without further flame cracking). Such operation is therefore within the scope of this invention.

An object of this invention is to provide a novel process and apparatus for effecting continuous cracking of normally liquid hydrocarbon feed stock to porduce a high yield of combustible gas.

Another object is to provide a process and apparatus as described in which the combustible gas produced is of a uniform high quality and is characterized by lack of aldehyde and ketone odor, desirable methane and hydrogen content, low diolefin content, desirable gravity, and high heating value.

An additional object is to provide a novel process for the thermal cracking of a liquid hydrocarbon feed stock, to produce therefrom a combustible gas having a high heating value.

A further object is to provide a novel apparatus for the flame-cracking of hydrocarbon feed stock to produce therefrom a combustible gas.

A still further object is to provide a process and apparatus for the cracking of a liquid hydrocarbon material which is well adapted to pressurized operation, process adjustment, instrumentation, and the application of automatic controls, because of the simplicity and continuous nature of the process concept and of the apparatus elements.

Yet another object is to provide a two-stage cracking process wherein the make oil is first thermally cracked and then further cracked by direct contact with a flame, and in which by-product drip oil and tar maybe used as fuel for the thermal cracking stage.

A detailed description of the invention follows, taken in conjunction with the accompanying drawings, wherein.

Figure 1:
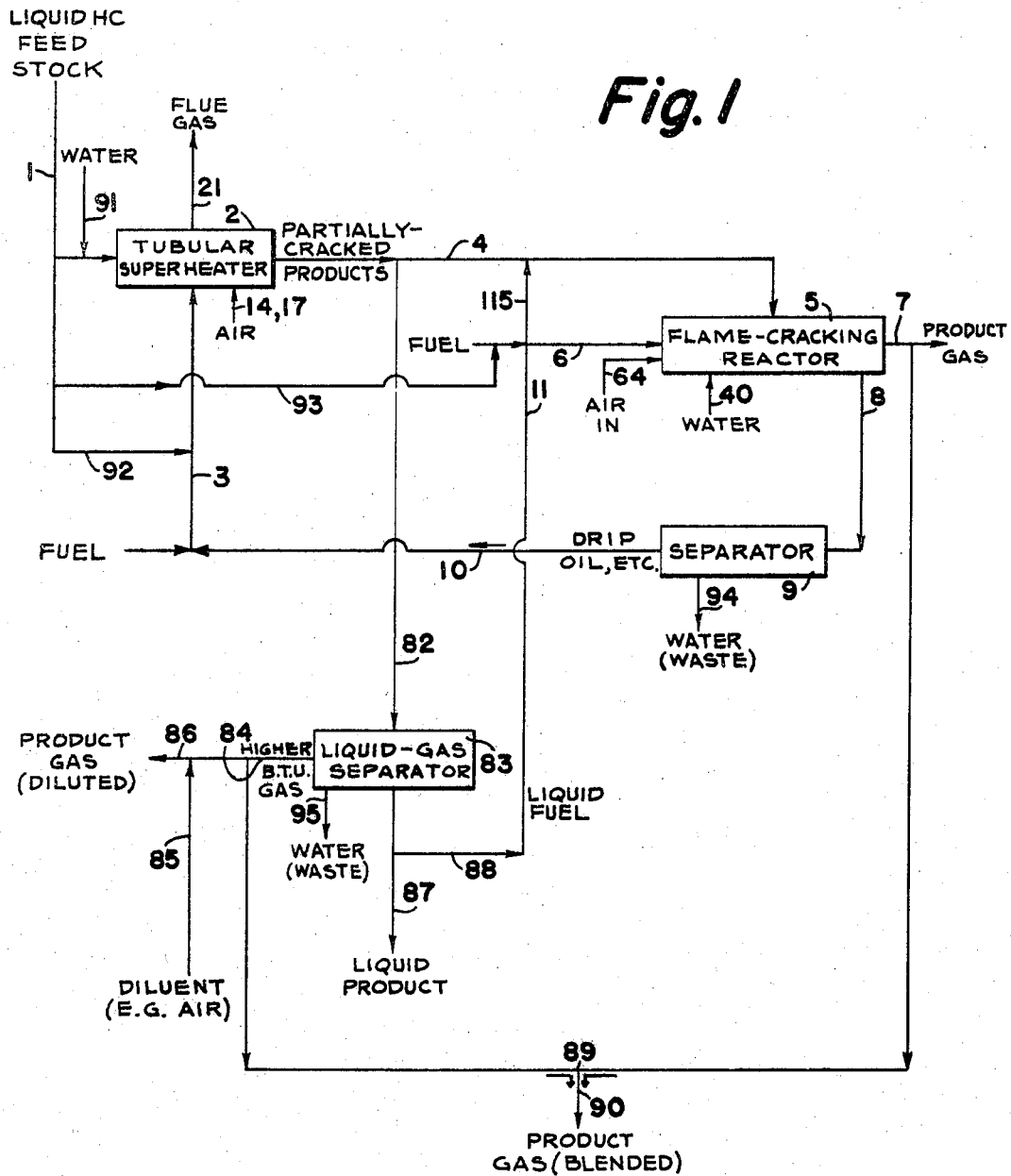
FIG. 1 is a flow diagram of a process according to this invention, the same representing several different modes of operation of the process.

The cracking feed stock or make oil employed in the process of the invention is preferably a normally liquid petroleum hydrocarbon fraction, although it could equally well be some other type of material, such as crude petroleum (which is of course not a fraction) or petroleum gas such as propane (which is not liquid at ambient temperatures and pressures). If a hydrocarbon fraction is used, it will have a final boiling point (end point) of up to about 750° F. The 95% point of the fraction will range up to about 700° F.; examples are kerosene, No. 1 fuel oil, No. 2 fuel oil, gasoline, and naphthas. Blends or mixtures of the above are also suitable. It is preferred that the feed stock contain a majority, i.e. 70%–100%, of saturated hydrocarbons having from four to ten carbon atoms per molecule. This includes straight and branched chain paraffins and alkyl-substituted naphthenes. It is desirable to use feed stocks having a fairly low content of olefins and aromatics. Thus, feed stocks having a boiling range of 80° F.–750° F. and containing 70%–100% saturated hydrocarbons, and less than 30% aromatics and olefins, are the preferred cracking stocks. The fraction can contain small amounts of sulfur compounds, nitrogen compounds, and other contaminants usually found in hydrocarbon fractions.

One liquid paraffinic light petroleum hydrocarbon fraction which can be used as cracking feed for the process of this invention is described in the prior Lipkin Patent No. 3,236,615, dated Feb. 22, 1966. The paraffinic concentrate therein described contains 75–100 vol. percent paraffinic hydrocarbons and less than 15% aromatic hydrocarbons plus olefins. Good results are obtained with hydrocarbon mixtures containing 75–100 vol. percent of paraffinic hydrocarbon including at least 25 vol. percent and preferably at least 40 vol. percent branched chain paraffinic hydrocarbons, less than 15 vol. percent and preferably less than 12 vol. percent naphthene hydrocarbons, less than 15 vol. percent and preferably less than 10 vol. percent of aromatic hydrocarbons, and less than 10 vol. percent and preferably less than 5 vol. percent of olefin hydrocarbons. The total volume of unsaturated hydrocarbons should be less than 25 vol. percent, and preferably less than 10 vol. percent.

A particular advantage of the present process over that disclosed in the Lipkin patent mentioned previously is the wider choice of make oils which can be used as feed stock for the process. The Lipkin process requires a highly paraffinic oil containing at least 25 vol. percent isoparaffins. The present process can crack naphtha and distillates containing high concentrations of naphthenes, such as 10–40 vol. percent.

Another particularly desirable cracking feed stock for the process is petroleum naphtha, i.e. refined, partly refined, or unrefined petroleum products and gas liquids not less than 95% of which distill below 464° F.

Briefly, in one aspect the proces of the present invention comprises first feeding petroleum hydrocarbon make oil (i.e., hydrocarbon feed stock) as a liquid, together with water, into a superheater to which heat is supplied by means of a burner. In the superheater, the feed stock is heated via indirect heat exchange to a maximum effluent temperature in the range of 1200°–1350° F.; this establishes thermal cracking conditions, and partial cracking of the feed stock (e.g., naphtha) takes place. Also, steam is of course produced. The material leaves the superheater as a superheated vapor, and this is fed (injected) into the region directly adjacent the flame of a process burner firing into one end of an elongated, vertically-disposed flame-cracking tube (reactor). More specifically, the feed into the cracking tube is directed toward the flame issuing from the combustion chamber of a high seat release burner (which may be deemed a combustor). Combustion of the burner fuel is essential completed in the combustion chamber of the burner. Therefore, the cracking-reactor feed is injected into the cracking reactor at a point where essential only hot combustion gases exist. It is essential for the finishing step (flame-cracking step) that there be no appreciable free oxygen in the flame-cracking zone.

A construction is provided in the tube, to effect a control of the mixing of the vapor feed and the hot combustion gases in the tube. At the end of the tube opposite to the burner, the gaseous products (produced as a result of the initial thermal cracking within the superheater, followed by the flame-cracking within the tube) are caused to reverse their direction and to move radially outwardly into a first annular region surrounding the tube. After another reversal (and a further radially outward movement into a second annular region, through which they then travel) at the distant end of this first annular region, the gases reach the distant end of the second annular region. Here, another reversal (and another radially-outward movement) takes place, and the gases move upwardly through a third annular region wherein cooling and scrubbing of the gaseous products is effected. In this third region, the condensables are removed from the gaseous products, and the cooled gases are removed from the upper portion of this third region for utilization. The condensables include drip oil and tar produced as by-products of the process, and the drip oil and tar maybe separated out from the other condensables (such as water) and used as fuel for the separate, fired superheater.

In another aspect of the present invention, the gaseous product from the superheater is used directly, without being fed into the flame-cracking tube for further cracking. The (thermally-cracked) effluent from the superheater contains a combustible gas of usable B.t.u. value, and this gas may be separated from condensables contained in the effluent and then used as a heating gas, either directly or in admixture with other gases. The condensables (i.e., liquid) separated out may be utilized as a valuable by-product, or may be used as fuel for the superheater.

Altenatively, a portion of the superheater effluent may be charged to the flame-cracking tube, the liquid being condensed and separated from the gas in the remaining portion and then used as fuel for the superheater. In this case, the relatively high B.t.u. gas from the superheater can be blended with the relatively low B.t.u. gas from the flame-cracker to produce a blended gas of controlled B.t.u. content.

Now referring to FIG. 1, the liquid hydrocarbon feed stock which is to be cracked is fed at 1 from a suitable tank (not shown) into the inlet side of a tubular superheater 2, to be later described more in detail. In some cases, water (or another suitable material such as hydrogen) may be fed at 91 to the superheater, along with the feed stock. The superheater 2 may comprise a coiled tube through which the feed stock passes, this tube being heated by a separate fueled burner to which fuel is supplied at 3. The feed stock may be used as fuel, by way of a connection 92. Air for the burner, and for dilution purposes, is supplied via a coupling 14, 17, and flue gas leaves via a stack coupling 21.

Conditions suitable for thermal cracking are established in the superheater, the maximum operating temperature at the outlet being about 1350° F. based upon a residence time within the superheater 2 itself of about 1½ seconds. The feed stock is pumped into the superheater 2 as a liquid and leaves as a superheated vapor together with the steam produced, since the superheater exit temperature of 1350° F. is considerably above the boiling points of any and all of the feed stocks mentioned hereinabove, and of course of the water, also. (If hydrogen is used, it of course would be in the effluent vapor from the superheater.) Partial thermal cracking of the feed stock, which is typically naphtha, occurs in superheater 2, and the partially-cracked-product or effluent stream leaves the superheater at 4. This effluent stream contains steam and a combustible gas having B.t.u. content in excess of 1000 per cubic foot, for example 1200 to 2000 B.t.u. per cubic foot.

According to a first mode of operation of the invention, all of the vaporous effluent from superheater 2 is charged as so-called make oil to a flame-cracking reactor 5, to be later described in more detail. The reactor 5 is of the same general type as that disclosed in the parent applications, and comprises an elongated tube having a burner at one end thereof directed into the tube. The vapor is fed or charged into this tube adjacent the burner end thereof and directed toward the burner flame. The burner is supplied with fuel at 6. In some cases, the original feed stock may be used as fuel, supplied via a connection 93. Combustion air is supplied to the burner via a coupling 64. Alternatively, other fuels such as hydrogen may be used for both the superheater 2 and the reactor 5.

The feed stock, which is subjected to partial thermal cracking in the superheater 2, is subjected to further, flame-cracking in the reactor or flame cracker 5, as will later be explained in more detail, producing a good yield of combustible gas whose B.t.u. content is not as high as that in the superheater effluent, but which is still of acceptable value. (e.g., 500–1100 B.t.u. per cubic foot). This combustible gas is usable as a fuel gas.

At the downstream side of the reactor 5, there is a cooler-scrubber region (to which water is supplied at 40) through which the gaseous product passes before leaving this reactor at 7. From the bottom of the cooler-scrubber, the condensables (comprising mainly by-product drip oil and tar) are carried out at 8 with the scrubbing medium. This mixture is sent to a separator 9 which separates out the drip oil and tar; this drip oil and tar are collected and may be used as fuel for the superheater 2, by way of a coupling 10 which feeds into the fuel supply 3 for the superheater. It is pointed out that, in the process of this invention, the by-products typically amount to approximately only 1–15% of the total feed used; many of the prior processes make up to 50% by-products. Waste water leaves the separator 9 at 94.

Figure 2:
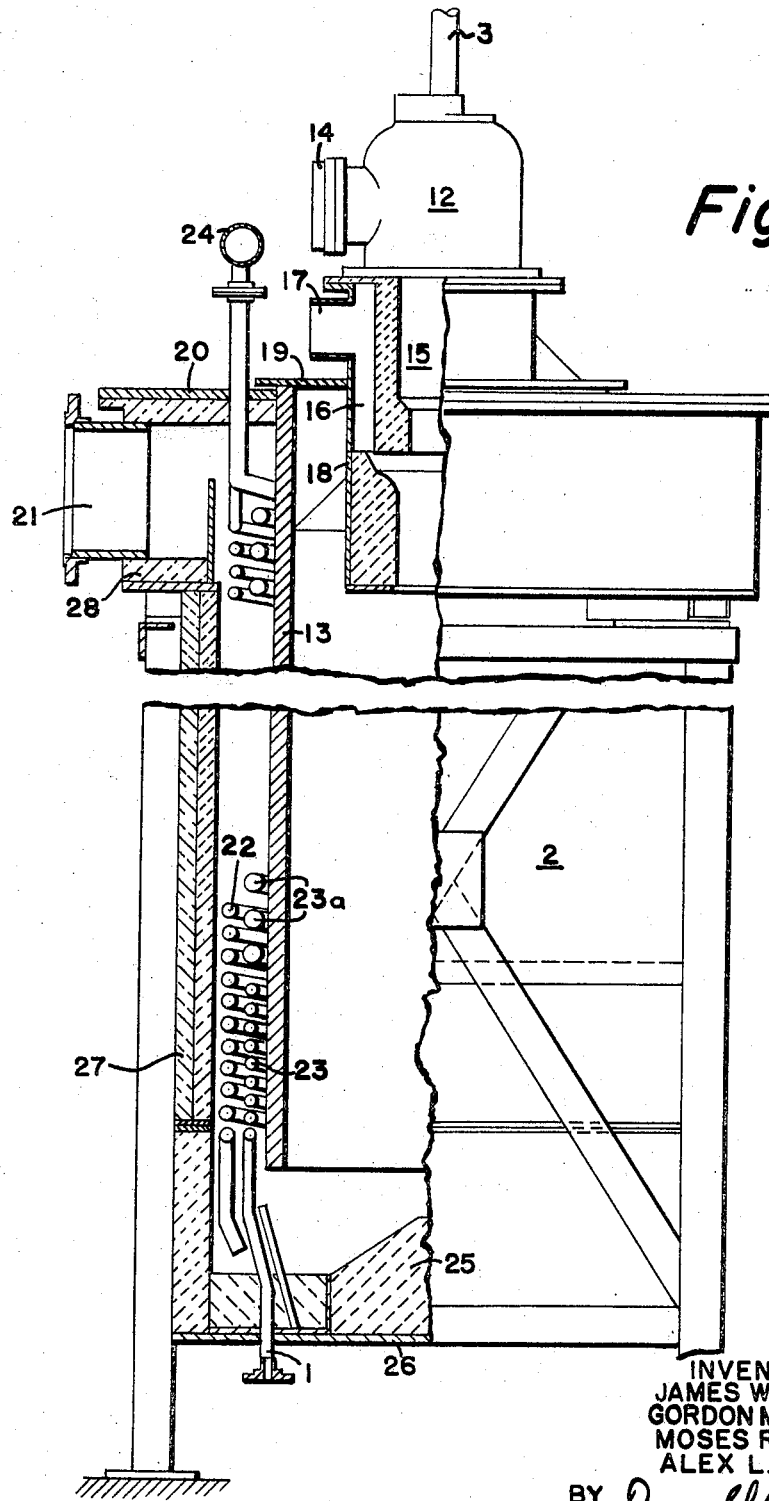
FIG. 2 is a combined longitudinal section and elevation of a superheater used in the process of FIG. 1.

As previously described, the product gas leaving the reactor 5 at 7 may be used alone, or in admixture with other gases, as a fuel (heating) gas. Refer now to FIG. 2, which is a combined longitudinal section and elevation of a typical fired tubular superheater which may be used at 2. A burner 12 is mounted to fire into the upper end of a vertically disposed elongated diverter baffle 13, which latter is simply an elongated hollow metallic body or tube. The burner 12 is not shown herein in detail, since per se it forms no part of the present invention. By way of example, it can be a vaporizing oil burner (a high velocity oil burner) having the construction disclosed in Re. Patent No. 24,682, dated Aug. 18, 1959.

The fuel is supplied to burner 12 by way of a coupling 3 provided on the upper end of the burner housing. Fuel may be supplied to the burner 12 from a separate source, for example from the feed stock source, but the fuel used by this burner is preferably derived from the drip oil and tar output of separator 9, via coupling 10 (FIG. 1). Air under pressure for combustion (supplied, for example, by means of a suitable blower) is introduced into burner 12 by means of a suitable pipe (not shown) attached to a coupling 14 provided at one side of the burner housing.

A primary combustion chamber 15, made of refractory material and having circular cross-section, extends toward and into baffle or tube 13 from that end of the burner housing opposite to fuel pipe 3. A secondary coaxial combustion chamber 16 surrounds chamber 15, and so-called "dilution" air is supplied to chamber 16 by way of a coupling 17. The secondary combustion chamber 16 is delineated by a cylindrical metallic wall 18, and an annular flange 19 secured to the outer surface of wall 18 and to a flanged cylindrical outer housing 20 engages the upper end of the baffle 13 to close this end.

The flame of the burner extends more or less axially of the baffle 13, and the hot products of combustion pass into the interior of this baffle to heat the same. The lower end of baffle 13 is open, and the hot products of combustion (flue gas) pass out this end of the hollow body 13 and back around the outside of the body, in the direction of burner 12, to a stack opening 21 which is located adjacent the burner end of baffle 13 and which communicates with the region external of this baffle. Flue gas exits via opening 21.

Metallic tubing wound in two separate helical layers (an inner layer 23 and an outer layer 22) surrounds the baffle 13, so as to receive heat through radiation therefrom. Also, the hot combustion gases, on their way from the open end of baffle 13 to stack 21, come into direct contact with the tubing 22, 23, thereby to transfer heat to this tubing. The longitudinal axes of helical layers 22 and 23 coincide with the longitudinal axis of the tube 13.

The liquid hydrocarbon feed stock which is to be converted to a superheated vapor by heating in superheater 2, and in such process to become partially thermally cracked, is fed (together with water, in some cases) through the working fluid inlet 1 into the lower end of inner tubing layer 23, this fluid then flowing through this inner tubing layer to the upper end thereof. As the liquid flows through the inner coil 23, it is heated mainly by radiation from the hot baffle 13 and by convection from the hot combustion gases, soon reaching its vaporization temperature, at which temperature it "flashes" or turns to vapor. The water, if present, is also vaporized to steam. From the point where this takes place to the upper or burner end of layer 23, the inner coil is formed from tubing of larger diameter, as indicated at 23a.

The outer tubing layer 22 is formed as a "double helix," that is, it comprises two coils having the turns of one interspersed between the turns of the other; this will provide for a so-called "multipass" action in the second or outer layer. The vapor leaving the upper end of layer 23 flows out of the superheater housing and into a manifold 24, from whence it splits into two parallel streams each one of which goes back into the housing and into a respective one of the two helices of layer 22. The two streams of vapor are heated further as they flow through the coils of outer layer 22 toward the outlet (lower) end of the superheater, and the superheated vapor (effluent) flows out of the lower ends of the outer coils 22, through a manifolded working fluid outlet 4 (see FIG. 1) which is not visible in FIG. 2 because it is aligned with (and therefore hidden by) inlet 1.

Although the outer layer 22 is disclosed herein as a "double helix," any whole number of coils greater than two can be used in this layer.

The tubular superheater 5 is designed for high velocity (the outlet velocity can exceed 200 feet per second, for example) and low ΔT between the tube walls and the vapor inside the tubes. The heat provided by the burner 12 is such that, for the high velocity of flow of the working fluid through the superheater (residence time therein of about 1½ seconds), the maximum operating temperature of the effluent at the superheater outlet (to wit, at outlet 4) will be about 1350° F.

The coil layers 22 and 23 are located in the annular region between the outer surface of baffle 13 and the inner surface of the flanged outer housing 20 which surrounds said baffle. In addition to the flange of housing 20, the upper end of the superheater 2 is closed by the housing of burner 12 and the annular flange 19. The other end of housing 20 has an insulating refractory end wall 25 spaced from the open end of baffle tube 13, and a cover plate 26 is fastened to the outer surface of wall 25. The central portion of the cylindrical wall of housing 20, over a length approximately commensurate with the lengths of coil layers 22 and 23, is covered with a heat-insulating jacket 27. A heat-insulating (refractory) lining 28 is provided in stack opening 21.

As previously noted, the superheated vapor (effluent) from the superheater 2 leaves the same through a manifolded working fluid outlet 4 (manifolded for combining together the two paralleled vapor streams passing through the "doubled" coil 22. According to one mode of operation or aspect of the invention, as previously described in connection with FIG. 1, all of the superheated vapor effluent from superheater 2 is charged as make oil (which may include steam) to the flame-cracking reactor 5. The reactor 5 will now be described in detail, in connection with FIG. 3.

Speaking generally, the flame-cracking reactor 5 of the present invention is a telescoped, vertical structure. The outer shell of the reactor is an elongated vertically-extending tube 29, which in a particular design (by way of example) had an O.D. of about 38 inches and a height of about 60 inches. A ring 30 closes the upper end of shell 29, and a ring 31 closes the lower end of this shell.

Concentrically mounted within tube 29 is a pair of spaced, concentric tubes 32 and 33 which are open at both ends and which are secured at their upper ends to the lower surface of ring 30. The outer tube 32 of this pair may have an O.D. of 27½ inches and the inner tube 33 may have an O.D. of 22¼ inches. The inner tube 33 is about six inches longer than the outer tube 32. A horizontal metallic mounting ring 34 is positioned between tubes 32 and 33 near the lower end of tube 32, this ring serving as a support for a cylindrical filling 35 of heat-insulating material which is provided between the tubes 32 and 33, the filling extending between ring 34 and the lower surface of ring 30.

A countercurrent cooler-scrubber, in which gas moves upwardly counter to a scrubbing and cooling medium such as water moving downwardly, is provided in the annular region between tubes 32 and 29. This cooler-scrubber utilizes a packing 36, for example ½-inch "Intalox" saddles, which is supported at the bottom by a combination support and distribution (apertured) ring 37. A set of four equiangularly-spaced handholes 38, each with a removable cover, is provided in outer shell 29 just above the ring 37, for removal of the saddles (packing).

An annular water chamber 39, to which water may be supplied by means of a fitting 40, is mounted on the upper surface of ring 30, in the radially-outer area thereof and vertically above the annular packing region. A distributor plate is provided in this annular portion of the ring 30, to allow water to flow from chamber 39 down onto and through the packing 36. It may be desirable to provide a vertically-extending baffle (not shown) within chamber 39, radially outside of the aforesaid distributor plate, to cause the water to flow from the fitting 40 around to the opposite side of the reactor, thus providing a more even distribution of the water over the packing 36.

A vertically-extending cylindrical partition 41 is mounted within shell 29, at the bottom of this shell, to provide a dam and to form an outer annular chamber 42 and an inner annular chamber 101 into which the lower end of tube 33 extends. The water flows downwardly through ring 37 into the chamber 101, filling this chamber and then overflowing into chamber 42. A water level which is not affected by the gas velocity can be maintained in chamber 42. A short pipe, to which is attached a flanged fitting 43, communicates with chamber 42 and enables draining of the water and other material which accumulates in this chamber. The pipe 8 (FIG. 1) connects to fitting 43. A set of six equiangularly-spaced handholes 44, each with a removable cover, is provided in the upper end of shell 29, for servicing of the water distributor plate and water chamber 39, and for installing new packing 36.

Concentrically mounted within tube 33 is a tube 45 which is open at its upper end and is secured at its lower end to the upper surface of ring 31. Tube 45 may have an O.D. of 17½ inches and a height of about 54½ inches. The chamber 101 is formed between the outer wall of tube 45 and the inner side of partition 41. Tube 45 has a hollow domed construction at its lower end, the hollow dome being filled with heat-insulating material 46. At the center of the dome just mentioned a pipe 47 filled with heat-insulating material forms a central plug in the dome and is secured loosely in place by means of a blind flange 48 bolted to the lower surface of ring 31, the pipe 47 passing through a central aperture provided in this ring. The heat-insulating material 46 is maintained in position at the bottom by means of a ring 49 whose outer periphery is welded to the inner wall of tube 45, and a plurality of equally-spaced slots 50 are cut through the wall of tube 45 below ring 49.

Concentrically mounted within tube 45, and forming the initial cracking tube of the flame-cracking reactor 5, is a tube 51 open at both ends and secured at its upper end to the lower surface of ring 30. Tube 51 may have an O.D. of 12¼ inches and a height of about 48 inches. The lower end of tube 51 is spaced somewhat above the upper end of the dome of tube 45.

Figure 3:
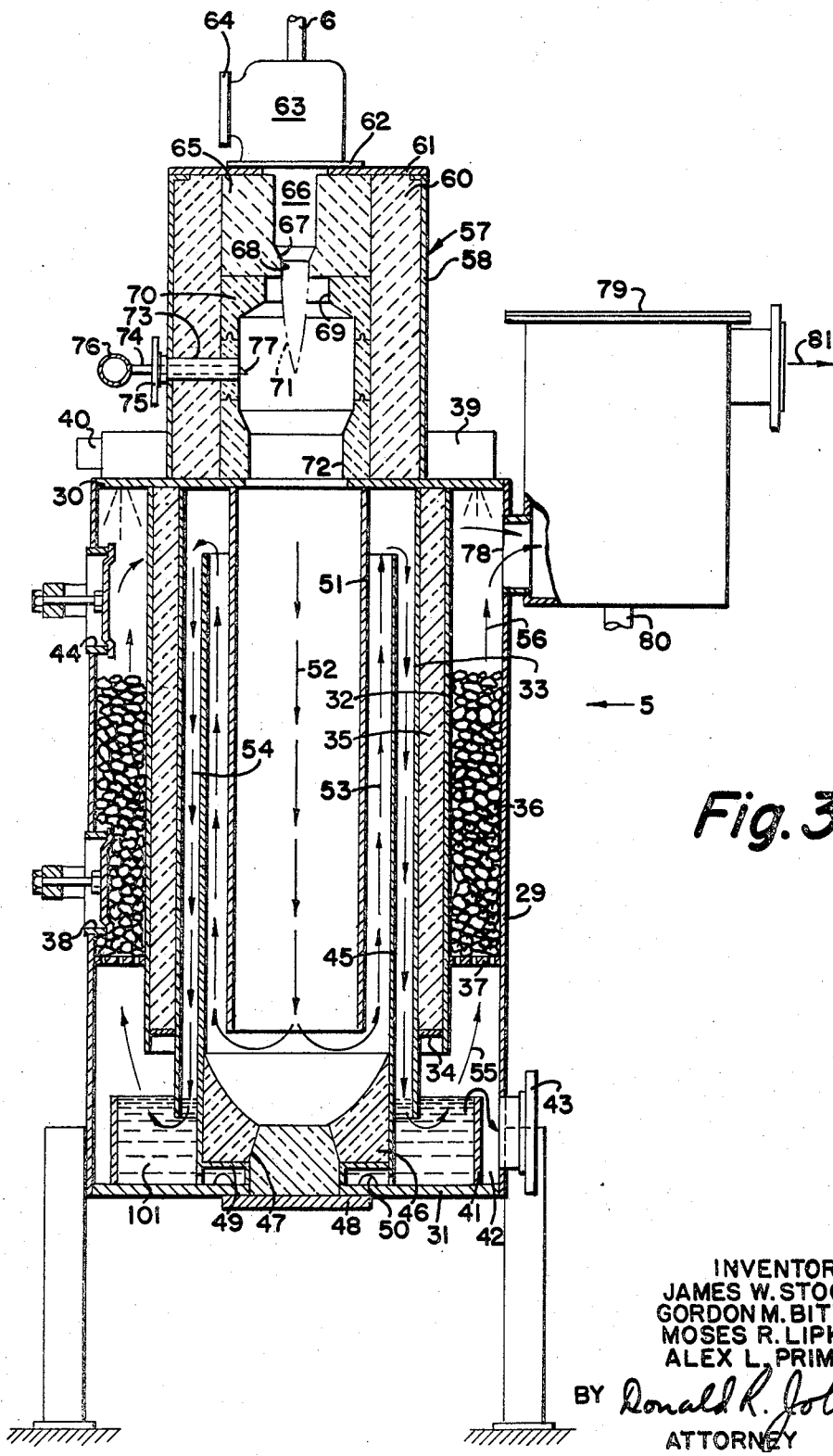
FIG. 3 is a longitudinal sectional view of a flame-cracking reactor used in the process.

The telescoped aspect of the construction may be appreciated from a consideration of the gas flow path indicated by means of dotted lines in FIG. 3. Thus, gases which pass downwardly as at 52 through the innermost tube 51 reverse their direction at the bottom of this tube and then pass upwardly as at 53 through the annulus between tubes 51 and 45. At the upper end of tube 45, they again reverse direction and then pass downwardly as at 54 through the annulus between tubes 45 and 33. At the lower end of tube 33, they come into contact with the water in chamber 101, and upon doing so, again reverse direction and then pass upwardly as at 55 into and through the packing 36, counter to the downward flow of water through this packing. Cooling of the gases takes place in chamber 101, and scrubbing and cooling of the gases takes place in the packed column 36, the scrubbed and cooled gases passing out of the packed column at 56.

A jacketed combustion chamber and burner assembly, denoted generally by numeral 57, is mounted at the upper end of the reactor 5, above ring 30. An outer cylindrical metallic wall 58, whose lower end is secured to the upper surface of ring 30, provides an interior space in which there is provided a suitable refractory material 60 to form a jacket around a combustion chamber 65. A ring-shaped end plate 61 is fastened, as by bolts (not shown), to the upper end of wall 58. The apertured mounting plate 62 of a burner 63 is secured to end plate 61 by means of bolts (not shown) which extend through the mounting plate 62 and thread into such end plate.

The burner 63 is not shown herein in detail, since per se it forms no part of the present invention. By way of example, it can be a vaporizing oil burner (a high velocity oil burner) having the construction disclosed in Re. Patent No. 24,682, dated Aug. 18, 1959. In this type of burner, the liquid fuel is vaporized before it is burned, the heat for fuel vaporization being taken from the combustion chamber of the burner through the suction action created at the venturi throat which is provided. The inherent faster burning characteristic of a vapor as compared to a liquid is the key to the unusually high heat release rate obtained in burner 63. In this connection, it is noted that the "heat release rate" of a burner is expressed in terms of B.t.u. released per hour, per cubic foot of combustion space. A "low" heat release rate would correspond to about 50,000–100,000 B.t.u. per hour per cubic foot of combustion space, while a "high" heat release rate would correspond to ten million or more B.t.u. per hour per cubic foot of combustion space.

The fuel is supplied to burner 63 by way of a coupling 6 provided on the end of the burner housing opposite to mounting plate 61. Air under pressure (supplied, for example, by means of a suitable blower) is introduced into the burner 63 by means of a pipe (not shown) which is attached to a coupling 64 provided at one side of the burner housing.

A combustion chamber 65, which is made of refractory material and which is circular in cross-section, extends downwardly from mounting plate 62. The chamber 65 includes a portion 66 of larger diameter which is adjacent the housing of burner 63, portion 66 being joined by a shoulder portion 67 to a portion 68 of smaller diameter. The portion 68 of chamber 65 acts as an orifice which divides the combustion zone of the burner flame longitudinally to prevent "back mixing." The portion 68 of chamber 65 is adjacent an upper throat or constriction 69 formed in a body 70 of refractory material which is positioned above the upper end of the tube 51, and the tip 71 of the burner flame extends out through the orifice 68 into the chamber formed by body 70 for a short distance, which is usually less than the combustion chamber length. The combustion chamber 65 performs flame holding or flame stabilization, in such a way that the combustion is substantially complete within the combustion chamber itself.

According to the present aspect of the invention, the flame is introduced into the end of an elongated tubular cracking zone comprising the body 70 to produce an intense heat release area therein, and the hydrocarbon feed stock is fed in finely distributed form into this intense heat release area in a direction toward the flame. Heat release, as the term is used in reference to the intense heat release area, refers to cracking of the hydrocarbon feed stock by contact with the flame produced by combustion of fuel in the high heat release burner.

The substantially conical flame-tip 71 extends more or less axially into the body 70, with the gaseous products of combustion passing through this body, more or less axially thereof, and then through the tube 51 (as at 52) more or less axially thereof. A high heat release burner of the type described provides the particularly desirable advantage of completely burning liquid fuels without building up carbon deposits on the wall of the combustion chamber and cracking tube or tubes.

Adjacent the ring 30, and thus also adjacent the upper end of tube 51, body 70 has formed therein a lower throat or constriction 72. This latter constriction, or narrowing down of the effective diameter inside the reactor, forces the gases travelling within the body 70 to be brought into more intimate contact with each other, optimizing the mixing and ensuring a more complete cracking.

Three conduits 73 (only one of which is shown in FIG. 3), spaced 120° apart in a horizontal plane around the cylindrical combustion chamber and burner assembly 57, extend through wall 58, jacket 60, and body 70, in a direction at right angles to the longitudinal axis of the reactor 5 (i.e., in a horizontal direction). Conduits 73 are located in the region adjacent the high heat release area (the combustion chamber) of burner 63. Each of the conduits 73 carries a coaxial injection or feed pipe 74, which latter extends through its respective conduit 73 to communicate with the hollow interior of body 70. The outer ends of the three pipes 74 are coupled, through flanges 75 on the conduits 73, to an annular or ring manifold 76 which in turn (according to one mode of operation of the invention) is coupled to the effluent pipe 4 (FIG. 1) from superheater 2, to receive superheated vapor from this superheater. Thus, according to this mode of operation, the superheated vapor effluent from the superheater is fed, via coupling 4 and manifold 76, to feed pipes 74.

At or near the inner wall of body 70, the inner end of each pipe 74 is cut off at an angle of 45° to the pipe axis, as indicated at 77, and an end plate (not shown) is welded or otherwise secured to the end of the respective pipe. The end plate has a small (e.g., ¼-inch diameter) orifice therein, this orifice providing in effect a nozzle. The superheated vapor feed passing radially inwardly (i.e., horizontally) through pipes 74 issues through the respective orifices generally in a direction toward the combustion chamber 65, and more specifically toward flame-tip 71. Thus, according to this mode of operation of the invention make oil (ie., superheated vapor feed from superheater 2) is directed against the flame, so that it actually is made to impinge on the flame-tip. The flame temperature is on the order of 3,000° F., for example. Flame-cracking of the make oil (which in this case is superheated vapor derived from the superheater, after the original feed stock has been partially thermally cracked in the latter) takes place, as will hereinafter be explained in more detail, producing a good yield of combustible gas (product) which has an acceptable heating value (expressed in B.t.u. per cubic foot). If water is being used in the superheater 2, the "make oil" fed into the reactor 5 will include steam.

The first mode of the operation of the invention involves introducing a superheated vapor (derived from a hydrocarbon feed stock) into the region immediately adjacent to the flame of a burner firing into one end of a hollow body. Upon impingement of the vapor upon the flame, the latter may lose its luminosity and become a "gray-gas." The flame which is schematically represented in FIG. 3 thus may actually consist of a gray-gas which has the radiation characteristics, but not the luminosity, of a luminous flame.

The portion of the reactor 5 from the burner side of plate 61 to the lower end of body 70 may be thought of as the burner and mixing chamber portion of such reactor. The reason for this latter terminology should be obvious when it is realized that the superheated vapor feed is fed into body 70 at 77, to contact the flame-tip 71 and then to mix in body 70 with the hot gaseous products of combustion produced by burner 63.

It has been found that with the reactor 5 (which utilizes the phenomenon of flame-cracking as a finishing step for the partial thermal cracking which takes place in superheater 2), cracking is completed within a very short distance from the flame-tip 71 which emerges from the combustion chamber 65. In fact, the very local space (which may be thought of as the boundary layer of two streams, one of which is the superheated vapor stream and the other of which is the stream of gaseous combustion products from burner 63) in which the reaction takes place may be regarded as adjacent to the flame itself—hence, the term "flame-cracking."

The gaseous products emanating from the lower end of body 70 (which products may be thought of as a mixture of combustion products and products of cracking of the original feed stock) travel downwardly through tube 51 along path 52 to the lower end of this tube, then reverse their direction and travel upwardly as at 53 between tubes 51 and 45. When they reach the upper end of tube 45, they reverse their direction again and travel downwardly as at 54 between tubes 45 and 33. When they reach the lower end of the latter tube, they come into contact with the water in chamber 101, reversing their direction again as at 55 and entering the lower end of the packing 36.

The gases travel upwardly through packing 36 against the counter flow of cooling water which travels downwardly from chamber 39 through packing 36. In the cooler-scrubber region of packing 36, as well as in the chamber 101, condensables such as by-product drip oil and tar (and water) are condensed out and are carried out of the reactor 5, along with the scrubbing water at 43. This mixture (condensate and water) is carried by way of pipe 8 (FIG. 1) to the separator 9, wherein the drip oil and tar are separated out, this oil and tar then being returned by way of the coupling 10, 3 to fuel the superheater burner. Waste water leaves the separator 9 at 94.

The uncondensed gases, upon rising through the packing 36, pass as at 56 through an opening 78 provided at the upper end of the outer shell 29 into a demister 79. Demister 79 is a conventional entrainment separator equivalent to wire mesh construction, and functions to remove from the gases any traces of liquid remaining in mist form. The material removed by the demister 79 will be a mixture of water, drip oil, and tar; a drain 80 in the bottom of the demister provides for removal of liquid condensate collected on the demister. The combustible gas product leaves the demister as at 81, and the coupling 7 (FIG. 1) is connected to the "gas out" side of the demister. This combustible product gas may have a heating value of 500 to 1100 B.t.u. per cubic foot.

For operation, a suitable fuel may be burned in burners 12 and 63, employing for example an air/oil ratio in burner 63 which is from 60 to 100% of stoichiometric, and in burner 12 approximately stoichiometric or higher.

Burner 63 is supplied at 64 with an oxygen-containing gas such as air, oxygen-enriched air, or oxygen. If oxygen is used, a condensable diluent such as steam is preferably added in order to control the temperature. For ordinary operation, air is satisfactory.

The superheated vapor is injected as at 77 directly into the flame-cracking zone (i.e., it is injected directly toward the flame tip 71). This partially-cracked vapor is quickly and efficiently further flame-cracked in the cracking zone to provide a product which includes less than about 10% by volume of condensables, and less than 1% by volume of carbon.

According to this invention as a result of the flame-cracking action which takes place in reactor 5 the cracking is essentially fully completed in the head end portion (i.e., the burner and mixing chamber 70) of the cracking reactor, and the tubes 51, 45, and 33 (through which the gases pass at 52, 53, and 54, respectively) comprise in effect a holding tube combination through which the gases travel essentially unchanged, at least as regards their chemical composition. It is pointed out that the choke or constriction 72 at the downstream end of body 70 optimizes the mixing of the various gases in the cracking reactor 5. What is desired here is a controlled mixing, the mixing being controlled in relation to the injection of the main stream of superheated vapor into the combustion flame tip (and into the gaseous combustion products). This control is inherent in the design of the apparatus 5, including the number of injection nozzles, their distance from the flame, and other factors.

When the gases reach the upper end of chamber 101, they are at a temperature of around 1,250° F. The products contact the water in chamber 101, thereby being cooled, and then pass into the cooler-scrubber region of packing 36, wherein the cool water, passing through the packing countercurrently to the flow of gases, further cools and scrubs the gases, causing condensation of the condensables. The water cooling medium, and the condensate, finally reach the outer annular chamber 42 at the bottom of the reactor, and are then led off through the fitting 43. The gas product passes through the demister 79 and the coupling 7 (FIG. 1) to suitable storage and distribution facilities.

It is to be understood that a single one, or any number, of vapor feed orifices may be employed, depending upon the size of the unit and the volume of oil to be cracked. However, optimum results (in the way of yield, etc.) have been obtained with three orifices as above described.

The gas with the condensates removed is of a quality suitable for direct commercial distribution. The burning quality of gas produced in a particular cracking operation is a function of the composition of the feed stock. A wide variety of feed stocks can be used in the apparatus. It has operated successfully with the material (feed stock) known as "H-Fuel" (which is a liquid paraffinic light petroleum hydrocarbon fraction having an API gravity of 70.0, an initial boiling point of 100° F., an end point of 300° F., a total saturates content of 91.4 vol. percent, a total aromatics content of 5.6 vol. percent, and an olefin content of 3.0 vol. percent) and with light naphthas. Even some crude petroleums can be used.

The economic advantages of operating such a system as described, as contrasted to conventional units requiring elaborate cracking, cleaning, and quality control apparatus, are substantial.

As far as the feed stocks are concerned, good results are also obtained with heavy naphtha, commercial kerosene, straight run gasoline, and other feed stocks having a boiling range in the range of 80° to 750° F. and containing at least 70 vol. percent saturated hydrocarbons having four to ten carbon atoms in the molecule. Similar results to those obtained with flame-cracking are not obtained when these feed stocks are cracked employing only indirect heat.

Numerous operating factors can be varied in the flame-cracking reactor 5 to achieve optimum performance. These include capacity of burner, burner fuel and air feed rates, make oil rate, temperatures, and type and capacity of injection nozzles. These variables and others can be coordinated in accordance with known engineering practice to obtain efficiency from any size unit.

The flame-cracking reactor can be modified for pressure operation by conventional techniques, such as back pressure devices. Superatmospheric flame-cracking zone pressures can be used, preferably in the range of .05 to 100 p.s.i.g. However, even higher pressures can be used, and in some instances it may be advantageous to operate the reactor at the pressure which is wanted for distribution of the heating gas product. Operation of the reactor at an elevated pressure is preferred, since this increases the gas producing capacity for a reactor unit of given size.

In another mode of operation of this invention, the liquid hydrocarbon feed stock is partially thermally cracked in the tubular heater (heated tube) 2 as before, but in this case the effluent from the superheater is processed differently and is not passed through the flame-cracking reactor 5.

In this other or second mode of operation, the superheater is adjusted such as to produce a maximum vapor temperature at the superheater outlet in the range of 1,200° to 1,300° F., for a residence time in the superheater in the range of one to ten seconds, preferably in the range of two to six seconds. In this mode, as in the mode previously described, water is mixed with the feed to provide steam in the superheater, and specifically 0.25 to 0.6 pound of steam per gallon of feed. The superheater is preferably operated at a pressure above about 1½ atmospheres, although a lower pressure (e.g., atmospheric pressure) may be used.

Under the described conditions, the superheater effluent includes a higher B.t.u. (referred to the product gas at 7) combustible gas, one having a heating value for example of 1200 to 2000 B.t.u. per cubic foot. Such a gas, after being separated from liquid condensables, may be used directly or in admixture with other gases, as a fuel gas. In connection with the admixture mentioned, this "higher" B.t.u. gas may be blended with other gas to bring its heating value down to for example the 600 to 1500 B.t.u. (per cubic foot) range, e.g. down to about 1,000 B.t.u. per cubic foot if it is desired to use it interchangeably with natural gas, such as for peak shaving. The gravity and also the heating value of the "blend" may be controlled, within close tolerances.

Thus, referring again to FIG. 1, the superheater effluent at 4 may be fed at 82 into a liquid-gas separator 83, which includes a condenser for separating out the liquid condensables as condensate. The "higher" B.t.u. gas leaves separator 83 at 84 and may be admixed with a diluent (e.g., air) supplied at 85, to provide at 86 a diluted or blended product gas of lower heating value, which latter may be used as a fuel gas (e.g., interchangeably with natural gas). Instead of air, other suitable gases such as flue gas may be used at 85 as diluents for the "higher" B.t.u. gas at 84. Waste water separated out leaves separator 83 at 95.

The liquid product separated out by separator 83 may be used at 87 as a source of valuable chemical products, or it may be taken off at 88 and used as fuel; in this latter case, it is fed by way of couplings 10 and 3 to the superheater burner 12 (FIG. 2). In some cases, it may be desirable to feed this liquid product also into the make oil line leading to reactor 5, as at 11 and 115. Of course, this latter feed at 115 assumes that the reactor 5 is being used, as in the first mode of operation of the invention.

A superheater similar to that shown in FIG. 2 was employed to thermally crack a naphtha, which is, of course, a liquid light petroleum hydrocarbon. The table following gives the conditions for this test, together with the chemical composition of the liquid condensate (contained in the cracked products coming out of the superheater) and the mass spectrometric analysis of the cracked gas coming out of the superheater.

TABLE

| Superheater Conditions: | |
|---|---|
| Inlet vapor temperature, °F | 420 |
| Outlet vapor temperature, °F | 1,282 |
| Outlet skin temperature, °F | 1,370 |
| Flow rate, g.p.h. | 110.6 |
| Residence time, seconds | 4.08 |

| | Condensate out of Separator 83 | Gas out of Separator 83 |
|---|---|---|
| Relative proportions, wt. percent | 14.5 | 85.5 |
| Gravity, °API | 53.0 | |
| Specific gravity (Air=1.0) | | 1.086 |
| Chemical composition, vol. percent: | | |
| Aromatics | 23.9 | |
| Olefins | 8.3 | |
| Saturates | 67.8 | |
| Total | 100.0 | |
| Gas Analysis, mole percent: | | |
| Hydrogen | | 5.6 |
| Methane | | 29.5 |
| Ethylene | | 18.2 |
| Ethane | | 11.0 |
| Propylene | | 15.9 |
| Propane | | 3.0 |
| Butadiene | | 1.5 |
| Butylenes | | 6.7 |
| iso-Butane | | 2.9 |
| Pentenes | | 1.0 |
| iso-Pentane | | 1.3 |
| Hexenes | | 0.4 |
| Hexanes | | 1.3 |
| Benzene | | 0.5 |
| Nitrogen | | 1.2 |
| Carbon Monoxide | | None |
| Carbon Dioxide | | None |
| Total | | 100.0 |
| Gross heating value, B.t.u./cf | | 1.788 |

Operation of the superheater under the outlet temperature and residence time conditions stated for the second mode of operation of the invention (note that the conditions set out in the table conform to the former stated conditions) is advantageous for several reasons, now to be stated. In the first place, under these conditions the carbon formation (i.e., the coking) is low as compared with higher temperature operation. By way of example, under actual operation there was no evidence of superheater coking at outlet vapor temperatures below 1,300° F.; on the other hand, rapid coking did occur at 1,365° F. outlet vapor temperature (corresponding to 1,400° F. outlet skin temperature, which latter is the temperature of the inside wall of the superheater tube, at the outlet end thereof). In this connection, it may be desirable to admix steam (or water, which will be converted to steam) with the hydrocarbon charge, as previously described, to further reduce carbon formation or coking. In the second place, operation under the stated conditions results in a product gas of higher B.t.u. content and lower hydrogen content, as compared to higher temperature operating conditions.

It has been stated that all of the effluent may be taken from the superheater 2 and sent to the separator 83, for separation of the liquids; in this case, of course, the flame-cracking reactor 5 would not be used. Alternatively, a portion of the superheater effluent may be charged to the reactor 5 for flame-cracking, and the remainder sent to separator 83 for separation therefrom of the liquids (condensate). In this case, the separated liquid product can be used for fueling the superheater burner as before, and/or for fueling the reactor burner, the fueling of the reactor burner being effected by way of couplings 88, 11, and 6.

The relatively high B.t.u. gas (at 84) from the superheater 2 can be blended as at 89 with the relatively low B.t.u. gas (at 7) from the flame-cracking reactor 5, to produce at 90 a blended product gas of controlled B.t.u. content, e.g. about 1,000 B.t.u. per cubic foot.

The gas which is produced at 7 has utility as a heating gas, either alone or in admixture with other gases such as natural gas or propane, for example. It is also useful as a source of ethylene, since it contains a remarkably high concentration of ethylene, though practically no acetylene. The ethylene can be separated from the product gas by known procedures such as selective adsorption or selective absorption. Alternatively, the ethylene can be subjected in situ in the product gas to reactions which convert the ethylene into a valuable product such as ethyl chloride, which is then separated from the other gases in the product gas. In sum, the gas produced at 7 may be used both as a heating gas and a source of chemicals; the olefins may be partially or completely removed from the product gas, and the remainder then used as a heating gas.

In the present apparatus, none of the moving parts are subjected to high temperatures, in contrast to previously-known apparatus. This is a definite advantage.

If it were desired for some reason to produce at 7 a product gas having a fairly low heating value, for example about 600 B.t.u. per cubic foot, the operating conditions would be changed somewhat, as compared to those mentioned previously. In this case, the maximum temperature of the superheater (preheater) effluent at 4 would be in the range of 600–900° F., and steam would not necessarily be used, but could be used if desired. This lower temperature superheater effluent would be fed to the flame-cracking reactor 5, to achieve the desired cracking.

Figure 4:
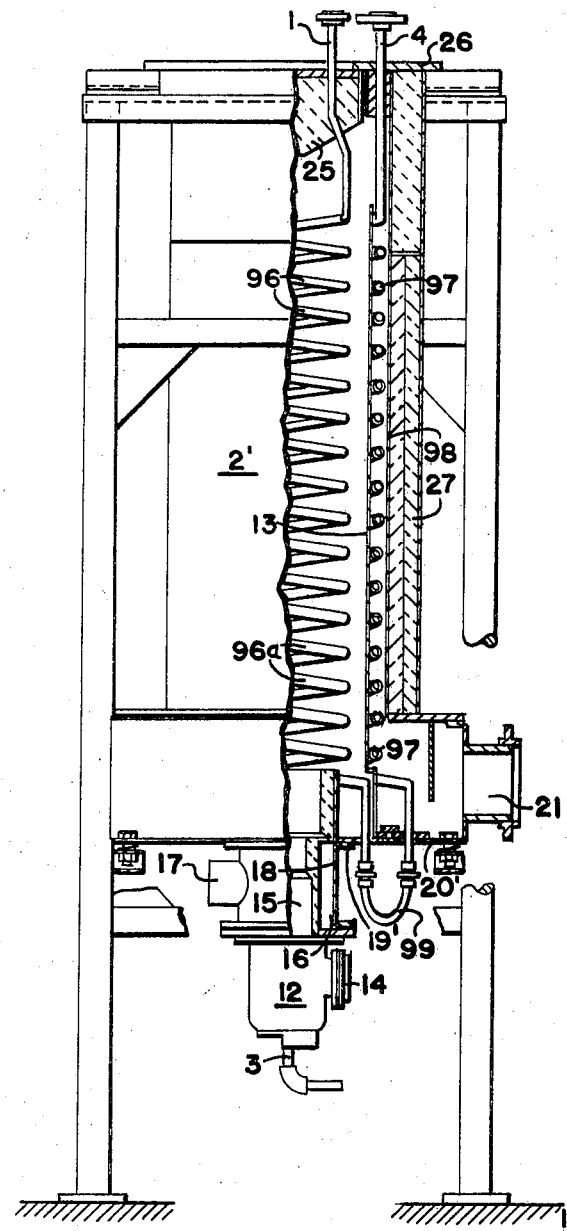
FIG. 4 is a view similar to FIG. 2, showing a modified superheater construction.

FIG. 4 discloses another embodiment of a superheater which can be used in the process of this invention. FIG. 4 is a combined longitudinal section and elevation of a superheater 2'. In FIG. 4, parts the same as those of FIG. 2 are denoted by the same reference numerals, while certain parts similar to those of FIG. 2 are denoted by primed reference numerals. In FIG. 4, the burner 12 is arranged quite similarly to that in FIG. 2, except that in FIG. 4 the burner position is inverted as compared to FIG. 2; that is to say in FIG. 4 the burner is located at the lower end of the cylindrical hollow tube 13 and fires upwardly, rather than being located at the upper end of this tube and firing downwardly, as in FIG. 2. In FIG. 4, combustion air is supplied to the burner 12 at 14, and "dilution" air is supplied to the secondary combustion chamber 16 at 17. Fuel is supplied to burner 12 by way of coupling 3 provided on the lower end of the burner housing. In FIG. 4, the annular flange 19' near the upper end of the (outer) secondary chamber 16 is secured to the outer surface of wall 18 and to the annular flange 20' which in effect forms a cover for the lower end of baffle or tube 13.

Again in FIG. 4, as in FIG. 2 previously described, the flame of the burner extends more or less axially of the baffle 13, and the hot products of combustion pass into the interior of baffle 13. The hot products of combustion (flue gas) pass out the upper open end of the hollow body 13 and back down around the outside of this body, to stack opening 21. Flue gas exits via opening 21.

An inner layer 96 of metallic tubing is wound in the form of a helix inside the diverter baffle or tube 13, the longitudinal axis of helix 96 coinciding with the longitudinal axis of this tube. An outer layer 97 of metallic tubing is wound in the form of a helix outside the baffle 13, in the annular space between this baffle or tube and an outer shell 98. The longitudinal axis of helix 97 coincides with the longitudinal axis of tube 13.

The liquid hydrocarbon feed stock is fed (together with water, in some cases) to superheater 2' through the working fluid inlet 1 into the upper end of inner tubing layer 96, this fluid then flowing through this inner tubing layer to the lower end thereof. As the liquid flows through the inner coil 96, it is heated by the hot combustion gases within baffle 13, soon reaching its vaporization temperature, at which it "flashes" or turns to vapor. The water, if present, is also vaporized to steam. From the point where this takes place to the lower end of layer 96, the inner coil is formed from tubing of larger diameter, as indicated at 96a.

The vapor leaving the lower end of layer 96 flows out of the housing of superheater 2' and through a U-shaped tube 99, and thence back into the housing and into the lower end of outer coil 97. The stream of vapor is heated further as it flows through the outer coil 97 toward the outlet (upper) end of the superheater, and the superheated vapor (effluent) flows out of the upper end of outer coil 97 through the working fluid outlet 4.

The central portion of the outer shell 98, over a length approximately commensurate with the lengths of coil layers 96 and 97, is covered with a heat-insulating jacket 27.

Figure 5:
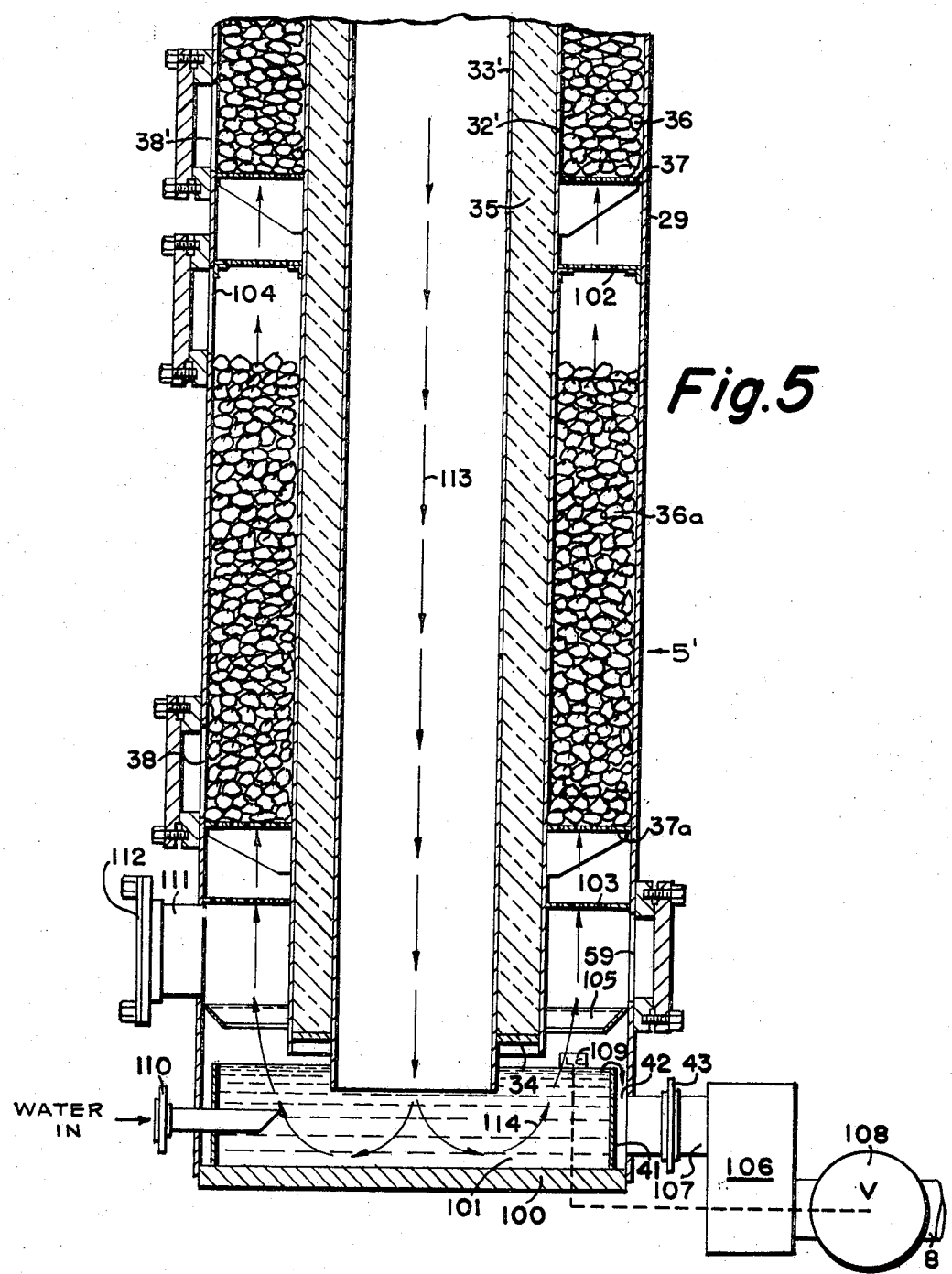
FIG. 5 is a partial view similar to FIG. 3, showing a modified flame-cracking reactor construction.

FIG. 5 illustrates a portion of another embodiment of a flame-cracking reactor which can be used in the process of this invention. FIG. 5 is a longitudinal section of the lower end of a reactor 5'. Speaking generally, the reactor 5' of FIG. 5 may be thought of as a U-design reactor, since the gas flow path therein (to be subsequently described) has the general form of the letter U; in this same vein, the reactor 5 of FIG. 3 may be thought of as a W-design reactor, since the gas flow path 52, 53, 54, 55 (previously described) has the general form of the letter W. Furthermore, it is to be stated that the overall height of the FIG. 5 reactor is considerably greater than that of the FIG. 3 reactor; the FIG. 3 reactor may have an overall height of about 9½ feet, whereas the FIG. 5 reactor may have an overall height of about 14 feet.

Again speaking generally, the flame-cracking reactor 5' (FIG. 5) is a U-design (telescoped) vertical structure. The outer shell of the reactor is an elongated vertically-extending tube 29. A cylindrical body 100, which may be made of metal, closes the lower end of shell 29, and also serves as a base support for the entire reactor 5'.

Concentrically mounted within tube 29 is a pair of spaced, concentric tubes 32' and 33' which are open at both ends and which are secured at their upper ends to the lower surface of a ring (not shown in FIG. 5) in the same manner as in FIG. 3. The tubes 32' and 33' are longer and of smaller diameter than the similar tubes in FIG. 3, and the inner tube 33' is somewhat longer than the outer tube 32'. A horizontal metallic mounting ring 34 is positioned between tubes 32' and 33' near the lower end of tube 32', this ring serving as a support for a cylindrical filling 35 of heat-insulating material which is provided between tubes 32' and 33'.

A countercurrent cooler-scrubber, in which gas moves upwardly counter to a scrubbing and cooling medium such as water moving downwardly, is provided in the annular region between tubes 32' and 29. This cooler-scrubber utilizes two vertically-spaced beds of packing 36 and 36a, each consisting of a large number of ½-inch "Intalox" saddles. The upper bed 36 is supported by an apertured ring 37 and the lower bed is supported by an apertured ring 37a. A horizontal apertured distribution ring 102, known as a "dual flow tray," is mounted between the two beds 36 and 36a, while a similar ring (not shown) is mounted above the upper bed 36. Another horizontal "dual flow tray" 103 is mounted below the lower ring 37a. A set of four equiangularly-spaced handholes 38, each with a removable cover, is provided in outer shell 29 just above the ring 37a, for removal of the saddles (packing) in lower packing bed 36a. A similar set of handholes 104, each with a removable cover, is provided in outer shell 29 below ring 102, and just above the upper end of the packing in lower bed 36a. A set of removably-covered handholes 38', similar to handholes 38, is provided in shell 29 just above the ring 37. A set of removably-covered handholes (not shown), similar to handholes 104, is provided in shell 29 just above the upper end of the packing in upper bed 36.

An annular water chamber (not shown), like chamber 39 in FIG. 3, is provided above the upper packing bed 36. Such water chamber provides a means for causing water to flow down through beds 36 and 36a in succession.

One or more handholes 59, each with a removable cover, are provided in outer shell 29 just below the tray 103, for cleanout purposes. Just below the lower edge of handholes 59, an annular beveled or saucer-shaped deflector baffle 105 is mounted within shell 29, surrounding but spaced from the outer surface of tube 32'. Baffle 105 extends downwardly and inwardly from the inner surface of shell 29, and functions to deflect the water, passing through tray 103, and dropping onto this baffle, radially inwardly from shell 29, that is, toward the longitudinal axis of the reactor. The water drips off the lower (and radially inner) edge of baffle 105 into an annular chamber 101 formed by the upper face of base plate 100 and by a vertically-extending cylindrical partition 41 which is mounted within shell 29, at the bottom of this shell. Partition 41 provides a dam and forms an outer annular chamber 42 and an inner annular chamber 101 into which the lower end of tube 33' extends. The water flows off baffle 105 into the chamber 101, filling this chamber and then flowing over the dam into chamber 42. A short pipe, to which is attached a flanged fitting 43, communicates with chamber 42.

A reserve tank 106, in which a water level is maintained at all times and which functions in effect as a trap (thereby preventing the escape of gas via the water drain line 8), is coupled by means of a pipe 107 to fitting 43. Water can flow from tank 106 to the waste pipe 8 (see also FIG. 1) through a controllable valve 108. Valve 108 is maintained flooded at all times (even when it is open) due to the water level in tank 106, above this valve. Valve 108 is actuated in response to a level controller 109 which senses the level of water in chamber 101 and which opens this valve only when chamber 101 is full; valve 108 is closed at all other times. Since valve 108 is maintained under flooded conditions at all times, no gas can escape from the reactor 5' through this valve, even when the latter is open.

During operation of the reactor, it is intended that chamber 101 be maintained full of liquid at all times. To ensure that this condition is present (e.g., even during start-up), water may be supplied to chamber 101 by means of a fitting 110 provided at the bottom of shell 29; this fitting communicates with chamber 101 by way of a short pipe.

A short section of pipe 111 communicates through a hole in shell 29 with the space between tray 103 and baffle 105, and the outer end of pipe 111 (outside of shell 29) is closed by means of a rupturable disc 112 (designed to rupture at a certain predetermined pressure); disc 112 ruptures (to open pipe 111 to the atmosphere and thus relieve the pressure inside the reactor 5') when the predetermined rupture pressure is reached. Items 111 and 112 thus provide a pressure-responsive protective device.

The U-design aspect of the reactor 5' may be appreciated from a consideration of the gas flow path indicated by dotted lines in FIG. 5. Thus, gases which pass downwardly as at 113 through the inner tube 33' travel toward the lower end of this tube. At the lower end of tube 33', they come into contact with the water in chamber 101, and upon doing so reverse direction and pass upwardly as at 114 into and through the packing beds 36a and 36 in succession, counter to the downward flow of water through these beds. Cooling of the gases takes place in chamber 101, and scrubbing and cooling of the gases takes place in the packing beds 36a and 36, the scrubbed and cooled gases passing out of the upper end (not shown) of packing bed 36.

A jacketed combustion chamber and burner assembly, exactly similar to assembly 57 in FIG. 3, is provided at the upper end of items 29, 32', and 33'. The arrangement is such that the upper end of inner tube 33' communicates with a lower throat or constriction (not shown) exactly as does the upper end of tube 51 in FIG. 3.

The partially-cracked products are fed into the burner assembly which is associated with reactor 5' quite similarly to the way such products are fed into reactor 5, previously described.

The action of the flame-cracking reactor 5' is rather similar to that of reactor 5, previously described. The gaseous products emanating from the lower end of the burner assembly which is associated with reactor 5' (which products may be thought of as a mixture of combustion products and products of cracking of the original feed stock) travel downwardly through tube 33' along path 113 to the lower end of this tube, then come into contact with the water in chamber 101, reversing their direction as at 114 and entering the lower end of the packing bed 36a.

The gases travel upwardly through packing beds 36a and 36 against the counter flow of cooling water which travels downwardly through the packing in these beds. In the cooler-scrubber region of beds 36a and 36, as well as in the chamber 101, condensables such as by-product drip oil, tar, and water are condensed out and are carried out of the reactor 5', along with the scrubbing water, at 43.

A demister (not shown) is provided above the upper surface of the packing bed 36, just as in FIG. 3. The uncondensed gases, upon rising through the bed 36, pass into and through the demister, and the combustible gas product leaves the demister and passes on to suitable storage and distribution facilities.

Just as in FIG. 3, previously described, the superheated vapor (from the superheater) is injected into the flame-cracking zone established in reactor 5'. This partially-cracked vapor is quickly and efficiently further flame-cracked in the cracking zone.

As a result of the flame-cracking action which takes place in reactor 5' the cracking is essentially fully completed in the head end portion (i.e., the burner and mixing chamber) of the reactor 5', and the tube 33' (through which the gases pass at 113) comprises in effect a holding tube through which the gases travel essentially unchanged, at least as regards their chemical composition.

When the gases reach the upper end of chamber 101, they are at a temperature of around 1250° F. The products contact the water in chamber 101, thereby being cooled, and then pass into the cooler-scrubber region of packing beds 36a and 36, wherein the cool water, passing through the packing countercurrently to the flow of gases, further cools and scrubs the gases, causing condensation of the condensables. The water cooling medium, and the condensate, finally reach the outer anular chamber 42 at the bottom of the reactor 5', and are then led off through the fitting 43, the pipe 107, the tank 106, the valve 108, and line 8, to separator 9 (FIG. 1).

Although it has been stated previously that advantages are obtained by using a combination of partial thermal cracking (in a superheater) and flame-cracking, as compared to solely flame-cracking (with vapor feed to the flame), the product obtained by the latter process is a combustible gas which is eminently satisfactory for many purposes. The prior application Ser. No. 426,785 discloses a process and apparatus for flame-cracking of a vaporized hydrocarbon feed stock, wherein the make oil is fed as a vapor into direct contact with a flame. Such a process and apparatus will now be described, in connection with FIGS. 6–8.

Figure 6:
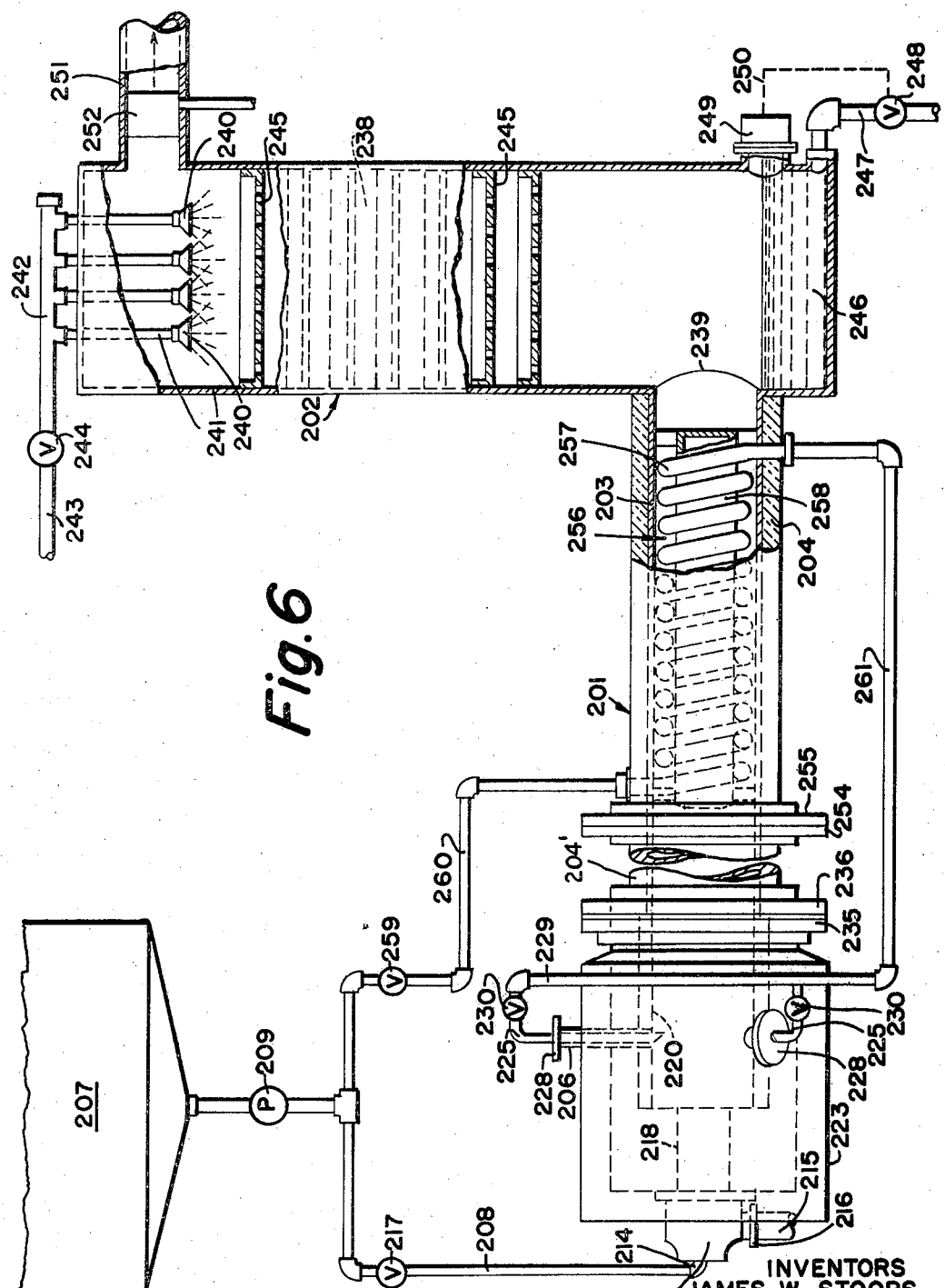
FIG. 6 is a side elevation, partly in section, of another form of gas preparation apparatus showing to the invention.
Figure 7:
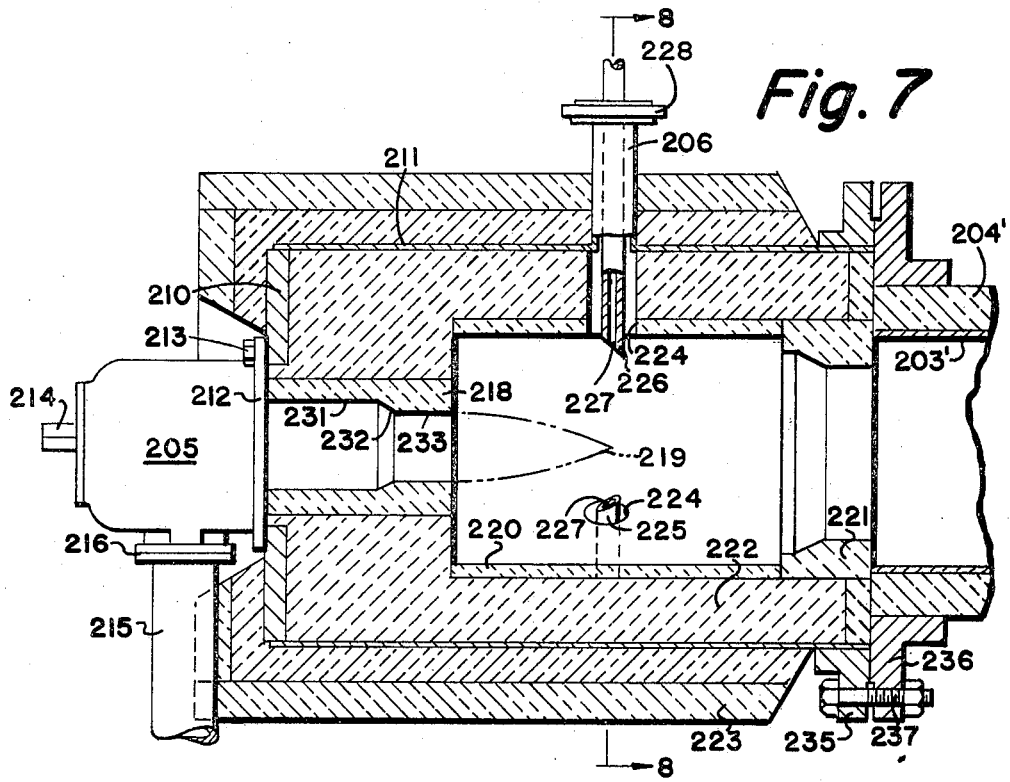
FIG. 7 is a vertical section, on an enlarged scale, of the burner end or head end of the composite cracking tube of the apparatus of FIG. 6.
Figure 8:
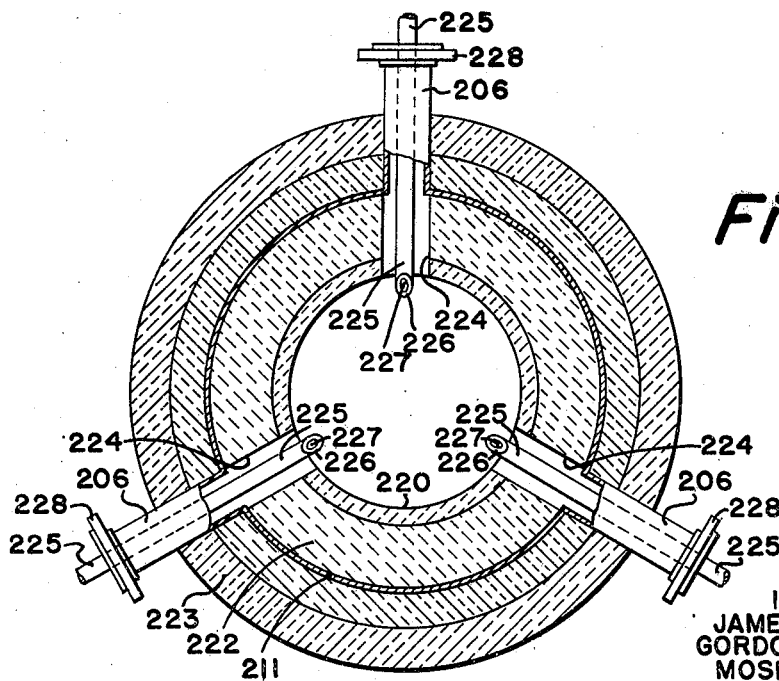
FIG. 8 is a section taken along line 8—8 of FIG. 7.

Now referring to FIGS. 6–8, another form of gas preparation apparatus includes an elongated horizontally-extending cracking tube 201 leading into a condenser-cooler 202 vertically disposed at one end thereof. That portion of the composite cracking tube 201 nearest the condenser-cooler may include an in-line vaporizer or heat exchanger (as hereinafter described) for vaporizing the feed stock prior to its entry into the cracking tube. This portion of the tube comprises a substantially cylindrical metallic tube element 203 surrounded by an insulating layer 204. The shape of the cracking tube is not critical and, although a substantially cylindrical tube is preferred, a tube of another shape could be effectively utilized. Moreover, although the cracking tube 201 is shown as horizontally disposed, it can equally well be disposed vertically.

A burner 205 is disposed at the end of the cracking tube opposite the condenser-cooler 202. Conduits 206 which carry injection or feed nozzles (orifices), passing through the wall of the cracking tube, are located in the region adjacent the high heat release area (the combustion chamber) of the burner. The feed stock to be cracked, which in this embodiment is also the burner fuel, is stored in a tank 207 and is pumped to the burner 205 through a conduit 208 by pump 209.

Referring to FIG. 7, a ring-shaped end plate 210 is fastened to the inner wall of a metal pipe 211, at one end thereof. The pipe 211 forms the main supporting or strengthening part of the composite cracking tube 201, at the burner end or "head end" thereof, and may have an O.D. of twenty-four inches. The apertured mounting plate 212 of the burner 205 is secured to end plate 210 by means of bolts such as 213 extending through the mounting plate 212 and the end plate 210.

The burner 205 is not shown herein in detail, since per se it forms no part of the present invention. By way of example, it can be a vaporizing oil burner (a high velocity oil burner) of the same type as burner 63, previously described.

The fuel is supplied to burner 205 by way of a coupling 214 provided on the end of the burner housing opposite to mounting plate 212. The fuel supply conduit 208 (FIG. 6) is connected to coupling 214, a valve 217 being provided for control of the fuel flowing from tank 207 through conduit 208. Air under pressure (supplied, for example, by means of a suitable blower) is introduced into the burner by means of a pipe 215 (FIG. 6) attached to a coupling 216 provided at the bottom of the burner housing.

A combustion chamber 218, which is made of refractory material and which is cylindrical in cross-section, extends outwardly from mounting plate 212 into the pipe 211. The chamber 218 includes a portion 231 of larger diameter (say 5¼ inches diameter, for example) which is adjacent the housing of burner 205, portion 231 being joined by a shoulder portion 232 to a portion 233 of smaller diameter (say four inches diameter, for example). The portion 233 of chamber 218 acts as an orifice which divides the combustion zone of the burner flame longitudinally to prevent "back mixing." The portion 233 of chamber 218 is adjacent one end of the interior of cracking tube 201, and the tip 219 of the burner flame extends out through the orifice 233 into the chamber 220 for a short distance, which is usually less than the combustion chamber length. The chamber 218 performs flame holding, or flame stabilization, in such a way that the combustion is substantially complete within the combustion chamber 218 itself.

As illustrated in FIG. 7, the susbtantially conical flame tip 219 extends more or less axially into the cracking tube 201, with the gaseous products of combustion passing through the tube, more or less axially thereof, toward the condenser-cooler 202 (FIG. 6). A high heat release burner of the type described provides the particularly desirable advantage of completely burning liquid fuels without building up carbon deposits on the walls of the combustion chamber and cracking tube.

The interior of the cracking tube 201, at the head end or burner end thereof, is provided by a hollow cylindrical chamber 220 formed from a suitable refractory material (e.g., cut, shaped tiles), one end of this chamber being in the same vertical plane as the outer end of portion 233 of combustion chamber 218. Chamber 220 may have an inside diameter of fourteen inches and an outside diameter of 15½ inches. Adjacent the downstream end of chamber 220 is a collar or choke member 221 (made of refractory material) which provides a constriction or throat within the chamber 220. This constriction, or narrowing down of the effective diameter inside the chamber, forces the gases traveling within the chamber to be brought into more intimate contact with each other, optimizing the mixing and ensuring a more complete cracking. At its narrowest portion, the constriction 221 provides an opening of 10½ inches diameter within the cracking tube. The combined length of chamber 220 and collar member 221 may be about twenty-five inches, and the downstream end (i.e., the end remote from the burner 205) of member 221 is in substantially the same vertical plane as the end of pipe 211.

A body 222 of refractory material is positioned within pipe 211, this body surrounding the combustion chamber 218 and the chamber 220, and completely filling the annular space between the outer walls of elements 218 and 220 and the inner wall of pipe 211. Body 222 also covers that face of plate 210 opposite to burner 205. A jacket 223 of heat-insulating material surrounds the pipe 211. This jacket 223 is preferably formed in two separate layers, as illustrated, and covers the outside of pipe 211, as well as that face of plate 210 which is adjacent to burner 205.

Three conduits 206 (only one of which is shown in FIG. 7), spaced 120° apart around the composite cylindrical cracking tube, extend through jacket 223 and pipe 211, in a direction at right angles to the longitudinal axis of the pipe, and respective aligned cylindrical apertures 224, each forming in effect a continuation of the bore of its respective conduit, extend through body 222 and the wall of chamber 220. By way of example, the conduits 206 may be located about 9½ inches from the burner or upstream end of chamber 220. Each of the conduits 206 carries a coaxial injection or feed pipe 225, which latter extends through its respective conduit 206 and aperture 224 to communicate with the interior of chamber 220. At or near the inner wall of chamber 220, the inner end of each pipe 225 is cut off at an angle of 45° to the pipe axis, and an end plate 226 is welded or otherwise secured to the end of the respective pipe. End plate 226 has a small (e.g., ¼-inch diameter) orifice 227 therein, so that vaporized feed passing radially inwardly through pipes 225 issues through the respective orifices 227 generally in a direction toward the combustion chamber 218, and more specifically toward flame tip 219. That is to say, according to this invention make oil (e.g., vaporized feed) is directed against the flame, so that it actually is made to impinge on the flame-tip. The flame temperature is on the order of 3000° F., for example. Flame-cracking of the feed stock (make oil) takes place, as will later be explained in more detail, producing a good yield of combustible gas (product), and also a product having an acceptable heating value (expressed in B.t.u. per cubic foot).

The outer ends of the three pipes 225 are coupled through flanges 228 on the conduits 206, to an annular manifold 229. Valves 230 are provided to regulate the flow into each pipe 225, although these are not absolutely essential. The means for vaporizing the feed stock (if vaporization thereof is desired) and for supplying such vapor to the manifold 229 (for feeding to the pipes 225) will be described hereinafter.

The length of the head end or burner end of the composite cracking tube 201, from the burner side of plate 210 to the downstream end of collar member or choke member or constriction-forming means 221, may be about three feet. The head end portion of the cracking tube 201, which has previously been described in detail, may be thought of as the burner and mixing chamber portion of such tube. The reason for this latter terminology should be obvious when it is realized that the vaporized feed stock is fed into chamber 220 at 227, to contact the flame tip 219 and then to mix in chamber 220 with the hot gaseous products of combustion produced by burner 205.

It has been found that with the apparatus of FIGS. 6–8 (which utilizes the phenomenon of flame-cracking for its operation), cracking is completed within a very short distance from the flame 219 which emerges from the combustion chamber 218, and the length of the composite cracking tube 201 may as a result be relatively short. In fact, the very local space (which may be thought of as the boundary layer of the streams) in which the reaction takes place may be regarded as adjacent to the flame itself—hence, the term "flame-cracking." The apparatus employs a flame temperature on the order of 3000° F., for example, and a very short residence time.

The volume of make oil, at injection conditions, is only a few percent of that of the combustion gases flowing, so the contact time-temperature profile conditions established by the degree of mixing, immediately at the flame tip 219, regulate the extent of cracking. The degree of mixing at the flame tip is neither complete, nor is it entirely incomplete. The desired conversion (cracking) is believed to take place mainly at the boundary layer of the two streams (one of which is the vaporized make oil stream and the other of which is the stream of gaseous combustion products).

A flange 235 is secured to the outside of the pipe 211, at the downstream end thereof, and a mating flange 236 is secured to the outside of a pipe 203' (which forms in effect a continuation of tube 203 previously referred to, and which may have a diameter of fourteen inches) which comprises a "holding tube" section of the cracking tube 201. Flange 236 is secured at one end of pipe 203', and bolts 237 are used to fasten the flanges 235 and 236 together. The pipe 203' is surrounded by an insulating layer 204' which forms in effect a continuation of the layer 204 previously referred to, and pipe 203' may be some eight feet in length, although its length is not at all critical; for example, it may be considerably shorter than eight feet. The pipe 203' is a straight tube providing an unobstructed passage for the flow of gases. The external insulating material 204, 204' (and also, of course, the jacket 223) is provided to reduce heat loss from the gases in the cracking tube 201. The internal body 222 also assists in the reduction of heat loss.

At the end of pipe 203' opposite to flange 236 (i.e., at the downstream end of this pipe), there is secured a flange 254 which mates with a flange 255 secured to the upstream end of tube 203, and bolts (not shown) cooperate with flanges 254 and 255 to secure the "holding tube" pipe 203' to the "vaporizer" tube 203.

The tube element 203 is about five feet in length, and a heat exchanger assembly 256 may be mounted therein. This in-line heat exchanger, if such is used, operates to vaporize the feed stock prior to its injection at 227 into the mixing chamber 220. The heat exchanger assembly 256 utilizes the hot gases in the cracking tube 201 to heat the feed stock prior to the entry of the latter into the head end of the cracking tube. Heat exchanger assembly 256 comprises a length of metallic tube in the form of a helical coil 257 suitably supported in the tube 203 and surrounding a diverter baffle or "dead man" 258, which latter is simply an elongated hollow metallic body about 7½ inches in diameter suitably supported coaxially in tube 203. The upstream end of baffle 258 is closed, and this baffle functions to divert the hot gases (which travel down the cracking tube 201) radially outwardly toward the annular area of tube 203 wherein the coil 257 is located. Although not illustrated in the drawings, two separate coils (an inner coil and an outer coil) may be used in the heat exchanger 256, these coils being connected together in series relation.

The feed stock to be cracked is pumped from tank 207 by pump 209, under the control of a valve 259, through a conduit 260 which is connected to the left-hand end of the in-line heat exchanger coil 257. As the feed stock proceeds through coil 257 from the left-hand end to the right-hand end thereof, it absorbs heat from the hot gases traveling down tube 203 toward the condenser-cooler 202, and reaches a temperature of about 700° F. in the process. This is well above its vaporization temperature. The gases in the tube 203 section of cracking tube 201, as they travel through this heat exchanger section, are decreased in temperature (by giving up heat to the material in tube 257) from about 1250° F. (at the upstream end of tube 203) to about 900° F. (at the downstream or condenser-cooler end of tube 203).

The vaporized but uncracked feed stock travels, by means of a conduit 261 one end of which is connected to the right-hand end of coil 257, to the annular manifold 229 previously mentioned, from whence it travels (as controlled by valves 230) to the three feed pipes 225 for injection into the cracking chamber by way of the nozzle-type orifices 227.

As just described, the mixture of gases in the cracking tube (i.e., the mixture of combustion and cracked or product gases) flows past the in-line tubular heat exchanger 256, which heats the incoming cracking feed stock to about 700° F., vaporizing the same under non-cracking conditions. In operation of the apparatus, it has been found necessary to provide a non-cracking period of for example fifteen to thirty minutes at periodic intervals, for example once every twenty-four to thirty hours, to get rid of fouling deposits from the hot gas side of heat exchanger 256. This removal of the deposits is conveniently effected by shutting off the supply of cracking feed stock or make oil at 259, while allowing the burner to remain on. This heats the coil 257 of the heat exchanger 256 to a temperature on the order of 1000° F., which vaporizes the solid deposits and thus removes them from the coil. If desired, water or steam may be fed, during this "clean-up" or non-cracking interval, into a separate conduit which is not shown, but which leads into the cracking tube at a location upstream of the heat exchanger. Such water or steam will provide a cooling effect on the heat exchanger coil 257.

The downstream end of the composite cracking tube 201 (i.e., the downstream end of the tube element 203) leads into a condenser-cooler unit 202 of conventional construction which in the embodiment illustrated is of the water or oil spray type and comprises a vertical, cylindrical casing 238 into which the downstream end of the cracking tube element 203 opens at 239, in the lower region thereof. The condenser-cooler includes at the top thereof oil or water spray heads 240 connected by conduits 241 to a manifold 242 which is connected by means of conduit 243 to a source of cooling oil or water. A valve 244 in the conduit 243 permits a control of the flow of oil or water to the spray heads 240. An array of vertically-spaced, perforated trays 245 secured horizontally across the casing 238 provides a labyrinth passage for the flow of gases from the cracking tube 201 against the counter flow of condensing oil or water from the spray heads 240.

The spray medium and condensate collect in the bottom of the casing 238 at 246. The fluids are removed through a drain line 247, the flow through which is controlled by valve 248. The spray medium and condensate 246 (which latter of course, may be thought of as the condensables contained in the gaseous products feeding at 239 from cracking tube 201 into the condenser-cooler 202) collecting in the bottom of the casing 238 constitute a seal preventing gases frm escaping from the condenser-cooler through the drain line 247. To maintain this seal at a level sufficient to cover the drain line 247 but below the entrance 239 of the cracking tube 201 into the casing 238, a level control unit 249 is provided. This latter unit is coupled as at 250 to valve 248, and operates this valve in a well-known manner to control the flow of liquid from the casing 238.

The gases, upon rising through the spaced trays 245 and the condensing spray medium, pass from the casing 238 through a duct 251 connected therewith above the spray heads 240. A demister 252 within the duct 251 removes any traces of liquid remaining in mist form from the gases.

For operation of the FIGS. 6–8 apparatus, a suitable fuel is burned in burner 205, employing an air/oil ratio in the burner which is from 60 to 100% of stoichiometric. When the feed stock to be cracked is also used as the fuel for the burner (which, as described, is the preferred mode of operation), about 3 to 15% of the total feed stock is consumed in the burner.

The burner is supplied at 215, 216 with an oxygen-containing gas such as air, oxygen-enriched air, or oxygen. For ordinary operation, air is satisfactory.

Feed stock (which may, for example, be vaporized) is injected directly into the cracking zone (i.e., is injected directly toward the flame tip 219) through the three orifice-nozzles 227. This vaporized material is quickly and efficiently flame-cracked in the cracking zone to provide a product which includes less than about 10% by volume of condensables, and less than 1% by volume of carbon.

The action of the choke member or constriction 221 is quite similar to that of constriction 72 (FIG. 3).

When the gases reach the downstream end of the holding tube or pipe 203′, they are at a temperature of around 1250° F. (compared to a temperature of around 1300° F. at a point approximately eight feet downstream from the location of orifices 227). These hot gases enter the in-line vaporizer portion (heat exchanger portion) of the apparatus, including the tube element 203 (if such heat exchanger is used), and give up heat to the feed stock passing through the coiled tube 257 of the in-line heat exchanger 256. The baffle 258 causes these hot gases to be deflected to the radially-outer portion of the tube 203, to thereby come into more effective heat-transferring relationship to the coiled metal tube 257 of the heat exchanger. The heat transferred to the tube 257 of the heat exchanger causes the feed stock to be vaporized (by being brought to a temperature of say 700° F.) by the time it leaves the heat exchanger by way of pipe 261. The gases in the cracking tube 201 are at a temperature of about 900° F. when they leave the heat exchanger portion of the cracking tube and enter into the condenser-cooler 202.

The products pass into the condenser-cooler 202, wherein the cool water or oil spray, passing through the perforated trays 245 countercurrently to the flow of gases, cools the gases, causing condensation of the condensable ingredients upon the cool surfaces of the trays. The gas product then passes through the demister 252 and the duct 251 to suitable storage and distribution facilities. The water or oil spray medium, and the condensate, collect in the bottom of the condenser-cooler casing 238, wherein the level control unit 249 maintains a proper fluid level to provide a liquid seal, preventing escape of the gaseous products. The collected fluid is then led off through the drain line 247.

The economics of operating such a unit as described in connection with FIGS. 6–8, as contrasted to conventional units requiring elaborate cracking, cleaning and quality control apparatus, are substantial.

An apparatus similar to that shown in FIGS. 6–8 was employed to flame-crack the liquid paraffinic light petroleum hydrocarbon fraction known as "H-Fuel," having the characteristics previously set forth. The fuel-air ratio employed in the burner was 93% of stoichiometric. The temperature at a point approximately eight feet downstream of vapor injection was steady at about 1299° F. Heating fuel was used (in the burner) at a rate of 11.2 gallons per hour, while the cracking feed stock rate was 109 gallons per hour. The temperature of the vaporized cracking feed stock, as injected into the cracking tube, was 695° F.

Taking an average sample of the fuel gas (combustible gas) produced, its specific gravity (calculated from a mass spectrometer) was 0.97, and its gross heating value, in B.t.u. per standard cubic foot (measured by a thermeter or calorimeter), was approximately 600. Its composition was as follows:

|  | Vol. percent |
|---|---|
| $H_2$ | 8.5 |
| $C_1s$ | 7.8 |
| $C_2s$ | 13.3 |
| $C_3s$ | 3.9 |
| $C_4s$ | 2.8 |
| $C_5s$ | 0.6 |
| $C_6s$ | 1.0 |
| $N_2$ | 51.8 |
| CO | 3.9 |
| $CO_2$ | 6.4 |

The B.t.u. conversion efficiency, from cracking feed stock to gas, was 89.9%; from total feed stock to gas, 81.9%.

The apparatus described in FIGS. 6–8 has a capacity of 0.3 million to one million cubic feet of product gas per day. Even though the make oil cracked in the above example was expected to crack cleanly, it is significant to note that the total drip oil, tar, and carbon deposit was less than 15%. It is also significant to note that the hydrogen content of the product gas was relatively low. A low hydrogen content, e.g. less than 30%, is necessary in the product gas so that carbon deposits will be kept to a minimum.

It is very significant to note that substantially all of the $C_2s$ in the product gas were ethylene, no appreciable amount of acetylene being formed in the cracking reaction. The presence of acetylene in the product gas is undesirable.

If desired, any number of cracking units can be operated from a single source of feed stock, by proper manifolding. The units can be operated in parallel.

The operation described in connection with FIGS. 6–8, in which the hydrocarbon cracking stock is preheated and vaporized prior to cracking, is advantageous in that it enables the attaining of the necessary cracking temperature with less burning of fuel than in an operation wherein the cracking stock is not preheated. Thus, with preheating, the ratio of fuel burned to provide combustion gases to hydrocarbon cracking stock is lower, and the proportion of combustion products in the product mixture of combustion gases and cracked products is less, than in an operation without preheating. Reduction of the amount of combustion products in the product mixture results in a higher B.t.u. value of the product mixture. In typical operation without preheating, a 470 B.t.u. product is obtained, as compared with 600 B.t.u. in operation with preheating of the cracking stock to 700° F. Conditions which increase the amount of heat supplied to the system for a given amount of combustion gases produced in the combustion, generally increase the B.t.u. value of the product mixture obtained, and by suitable regulation of conditions in the light of the present specification, a desired B.t.u. value can be obtained with suitable uniformity from a given cracking stock. Preheating of fuel and/or combustion-supporting medium, and use of oxygen or oxygen-enriched air as the combustion-supporting medium, enable higher B.t.u. values to be obtained in the product gas. The preheating of the hydrocarbon feed stock may be omitted in cases where a lower B.t.u. product is satisfactory, and in such instances the heat exchanger or in-line vaporizer disclosed in FIGS. 6–8 is omitted.

The foregoing description has contemplated that, when using the apparatus of FIGS. 6–8, the hydrocarbon feed stock will be passed through an in-line heat exchanger (vaporizer) and the resulting vapor will be fed as make oil to the flame-cracking reactor, and that, when using the apparatus of FIGS. 2–5, the hydrocarbon feed stock will be (according to the first mode of operation of the FIG. 1 process) passed through a separate, fired superheater and the resulting partially-thermally-cracked superheated vapor will be fed as make oil to the flame-cracking reactor.

When using the apparatus of FIGS. 2–5 (and the first mode of operation of the FIG. 1 process), process economics may necessitate some means of heat exchange between feed stock and hot product gases. In this case, the design of the flame-cracking reactor 5 or the reactor 5' (depending of course upon which one is being used in the process) could be modified to incorporate therein an in-line heat exchanger similar to the exchanger 256 of FIG. 6. If this were done, it might be preferable to use, in association with the (modified) reactor, and "unpacked," essentially separate cooler-scrubber of the type shown in FIG. 6, rather than the packed, essentially integral cooler-scrubber shown in FIG. 3 or FIG. 5.

If the modification suggested in the preceding paragraph were made, a "boot-strapped" version of the process would result, wherein the cold feed stock would be heated by the product gases in the reactor, the heating then being completed in the separate, fired superheater 2. Thus, the heated feed stock would go through the superheater 2 after going through an in-line heat exchanger.

The following data show the effect of varying the temperature to which oil is superheated prior to passage from a superheater into a flame-cracking reactor in operation according to one embodiment of the invention. In the four runs for which data are given below, the conditions in the superheater were varied from run to run in order to vary the temperature of the superheated oil which was injected into the flame in the flame-cracking reactor.

| Temperature of superheated naphtha, °F | 700 | 900 | 1,100 | 1,280 |
|---|---|---|---|---|
| Gas analyses, mole percent: | | | | |
| Hydrogen | 8.5 | 10.3 | 9.3 | 12.4 |
| Methane | 7.8 | 8.7 | 9.9 | 22.1 |
| Ethylene | 11.9 | 12.7 | 14.0 | 14.4 |
| Ethane | 1.4 | 1.2 | 1.7 | 4.5 |
| Propylene | 3.9 | 3.7 | 3.9 | 5.9 |
| Propane | 0.0 | 0.2 | 0.3 | 0.4 |
| Butadiene | 0.8 | 0.9 | 0.9 | 1.0 |
| Butylenes | 1.7 | 1.1 | 1.3 | 1.5 |
| iso-Butane | 0.3 | 0.4 | 0.8 | 0.2 |
| n-Butane | | 0.2 | | 0.0 |
| Pentenes | 0.3 | 0.1 | | |
| iso-Pentane | | 0.7 | 0.6 | |
| n-Pentane | 0.3 | | | 0.3 |
| Hexenes | 0.1 | 0.2 | | |
| Hexanes | 0.9 | | 0.6 | 0.2 |
| Benzene | | | | 0.9 |
| Nitrogen | 51.8 | 49.3 | 46.5 | 28.7 |
| Carbon Monoxide | 3.9 | 5.1 | 4.5 | 4.5 |
| Carbon Dioxide | 6.4 | 5.2 | 5.7 | 3.0 |
| Gas properties: | | | | |
| Specific gravity (Air=1.0) | | 0.97 | 0.99 | 0.91 |
| Gross heating value, B.t.u./cf | 618 | 635 | 753 | 915 |

The invention claimed is:

1. Apparatus for the cracking of hydrocarbon feed stock, comprising an elongated cracking tube, a high heat release burner at one end of said tube directed into said tube, said burner providing a centrally-located flame of limited cross-section at said one end of said tube; and means for feeding a hydrocarbon feed stock generally radially into an unconstricted portion of said tube and into said flame.

2. Apparatus as set forth in claim 1, wherein said means comprises means for feeding vaporized hydrocarbon feed stock into said tube.

3. Apparatus as defined in claim 1, wherein said means includes means for vaporizing a normally liquid hydrocarbon feed stock and for superheating the vapor, and means for feeding the superheated vapor into said tube.

4. Apparatus for the cracking of hydrocarbon feed stock, comprising an elongated centrally-disposed cracking tube, a high heat release burner at one end of said tube directed into said tube, said burner providing a flame at said one end of said tube; means for feeding a hydrocarbon feed stock generally radially into said tube and toward said flame, thereby to flame-crack such feed stock and to convert the same to gaseous products which are mixed with combustion gases from said burner, the gaseous mixture then traveling through said tube away from said one end thereof; and outer tube concentrically surrounding said central tube and coupled at one end to the end of the latter opposite to said one end thereof, whereby the gaseous mixture travels through the annular space between said central tube and said outer tube in a direction opposite to its direction of travel through said central tube; and means for abstracting gases from the other end of said outer tube.

5. Apparatus as set forth in claim 4, wherein said first-mentioned means comprises means for feeding vaporized hydrocarbon feed stock into said tube.

6. Apparatus for the cracking of hydrocarbon feed stock, comprising an elongated cracking tube, a burner at one end of said tube directed into said tube, said burner providing a flame at said one end of said tube; means in said tube, near to but spaced from said one end thereof, forming therein a construction which extends over a limited length of said tube, and means for feeding a hydrocarbon feed stock generally radially into said tube and toward said flame, from a location which is a substantial distance away from said constriction, toward said one end of said tube.

7. Apparatus as defined in claim 6, wherein said last-mentioned means includes means for heating a normally liquid hydrocarbon feed stock to an elevated temperature conducive to the thermal cracking of such feed stock, said heating serving to convert said liquid to a superheated and partially-cracked vapor; and means for feeding the superheated and partially-cracked vapor into said tube, to thereby complete the cracking of the feed stock.

8. Process for converting a hydrocarbon feed stock to cracked products which comprises:
 (a) introducing an oxygen-containing gas and a fuel into a burner and burning the fuel to produce a flame,
 (b) introducing the flame into the end of an elongated tubular cracking zone to produce an intense heat release area in an unconstricted portion of said zone,
 (c) feeding a hydrocarbon feed stock in finely distributed form into said intense heat release area in a generally radial direction and directed into said flame,
 (d) flame-cracking the hydrocarbon to produce a mixture of combustion products and normally gaseous cracking products at a temperature in the range of 800° to 1600° F., and
 (e) recovering a product gas from said mixture.

9. Process according to claim 8, in which said feed stock is introduced in gaseous form.

10. Process according to claim 8, in which said product gas is produced in yield of at least about 90 wt. percent based on fuel plus hydrocarbon feed stock plus oxygen-containing gas.

11. Process according to claim 8, in which said feed stock is a light liquid petroleum fraction having a 95% point below about 700° F.

12. Process according to claim 8, in which the oxygen-containing gas is air.

13. Process according to claim 8, in which the product gas contains less than 30% hydrogen.

14. Process according to claim 8, in which liquid hydrocarbon is heated to vaporize and partially thermally crack the same to produce said hydrocarbon feed stock.

15. Process according to claim 14, in which said product gas has a heating value of 500 to 1,100 B.t.u. per cubic foot.

16. Process according to claim 14, wherein for the heating step steam is mixed with said liquid hydrocarbon, in the proportion of 0.25 to 0.6 pound of steam per gallon of liquid hydrocarbon.

17. Process according to claim 8, in which liquid hydrocarbon is heated to vaporize the same to produce said hydrocarbon feed stock.

18. Process according to claim 17, in which said product gas has a heating value of 200 to 800 B.t.u. per cubic foot.

19. Process according to claim 18, in which said product gas is mixed with gas having a heating value of 500 to 3,000 B.t.u. per cubic foot, to produce a gas having a heating value higher than that of said product gas.

20. A continuous process for the preparation of a combustible gas comprising the steps of
   (a) introducing an oxygen-containing gas and a fuel into a first burner and burning the fuel to produce a first flame,
   (b) introducing the first flame into a tubular heat exchanger,
   (c) introducing an oxygen-containing gas and a fuel into a second burner and burning the fuel to produce a second flame,
   (d) introducing the second flame into the end of an elongated tubular cracking zone to produce an intense heat release area therein,
   (e) feeding a light liquid petroleum fraction having a 95% point below about 700° F. as hydrocarbon feed stock into and through said heat exchanger, thereby to vaporize and to partially thermally crack such fraction,
   (f) feeding the vaporized fraction directly into the said intense heat release area, in a direction toward said second flame,
   (g) flame-cracking the partially cracked fraction to produce a mixture of combustion products and cracking products in the range of 800° to 1600° F. and thereby producing combustible gas in yield of at least about 90 wt. percent based on fuel plus hydrocarbon feed stock plus oxygen-containing gas, and
   (h) recovering from said mixture a uniform combustible gas having a heating value of 500–1,100 B.t.u. per cubic foot.

21. Process for converting a hydrocarbon feed stock to cracked product which comprises:
   (a) passing liquid hydrocarbon feed stock through a heated tube for 1 to 10 seconds,
   (b) withdrawing partially cracked product from the tube at 1,200 to 1,300° F., and
   (c) separating from at least a portion of the partially cracked product a combustible gas having a heating value in the range from 1,200 to 2,000 B.t.u. per cubic foot.

22. Process according to claim 21, in which said combustible gas is diluted to a heating value in the range from 600 to 1,500 B.t.u. per cubic foot.

23. Process according to claim 21, in which
   (d) a portion of the partially cracked product is further thermally cracked to produce a combustible gas having a heating value in the range from 500 to 1,100 B.t.u. per cubic foot,
   (e) liquid is separated from a second portion of said product and used to fuel said further cracking, and
   (f) the relatively low B.t.u. gas produced by the further cracking is mixed with the relatively high B.t.u. gas separated from said second portion of said product to obtain a desired product having an intermediate heating value.

24. Process according to claim 21, in which steam is passed through said heated tube with said liquid hydrocarbon feed stock, in the proportion of 0.25 to 0.6 pound of steam per gallon of liquid hydrocarbon feed stock.

References Cited
UNITED STATES PATENTS

| | | | |
|---|---|---|---|
| Re. 24,682 | 8/1959 | Johnson | 158—1 |
| 2,790,838 | 4/1957 | Schrader | 23—277 XR |
| 2,823,243 | 2/1958 | Robinson | 48—196 XR |
| 3,047,371 | 7/1962 | Krause et al. | 48—211 XR |
| 3,284,168 | 11/1966 | Braconier et al | 23—277 |

MORRIS O. WOLK, Primary Examiner

R. E. SERWIN, Assistant Examiner

U.S. Cl. X.R.

23—277; 48—197, 211, 214